(12) United States Patent
Jiang

(10) Patent No.: US 7,616,954 B2
(45) Date of Patent: Nov. 10, 2009

(54) METHOD AND SYSTEM FOR PROVIDING GSMA IR. 73 SOR COMPLIANT CELLULAR TRAFFIC REDIRECTION

(75) Inventor: John Yue Jun Jiang, Danville, CA (US)

(73) Assignee: Roamware, Inc., San Jose, CA (US)

( * ) Notice: Subject to any disclaimer, the term of this patent is extended or adjusted under 35 U.S.C. 154(b) by 54 days.

(21) Appl. No.: 11/798,640

(22) Filed: May 15, 2007

(65) Prior Publication Data

US 2008/0020756 A1 Jan. 24, 2008

Related U.S. Application Data

(63) Continuation-in-part of application No. 10/635,804, filed on Aug. 5, 2003, now Pat. No. 7,072,651.

(60) Provisional application No. 60/800,034, filed on May 15, 2006.

(51) Int. Cl.
*H04W 4/00* (2006.01)
(52) U.S. Cl. ..................... 455/432.1; 455/433
(58) Field of Classification Search .............. 455/432.1, 455/433
See application file for complete search history.

(56) References Cited

U.S. PATENT DOCUMENTS

| 5,353,328 A | 10/1994 | Jokimies |
| 5,586,166 A | 12/1996 | Turban |
| 5,742,910 A | 4/1998 | Gallant et al. |
| 5,764,730 A | 6/1998 | Rabe et al. |
| 5,818,824 A | 10/1998 | Lu et al. |

(Continued)

FOREIGN PATENT DOCUMENTS

CA 2281041 A1 2/2001

(Continued)

OTHER PUBLICATIONS

GSM Association, May 13, 2005, IR 73 Steering of Roaming implementation guidelines.*

(Continued)

*Primary Examiner*—Lester Kincaid
*Assistant Examiner*—Steven Lim
(74) *Attorney, Agent, or Firm*—Arent Fox LLP

(57) ABSTRACT

The present invention provides a passive monitoring method of redirecting roaming traffic associated with a subscriber. The method includes retrieving a first transaction ID at a TR probe, by passively monitoring a registration message intended for a home location information database. The method further includes retrieving a second transaction ID at the TR probe, by passively monitoring an update message originating from the home location information database. Further, the method includes sending an abort message by a TR unit, to the home location information database with the second transaction ID as a Destination Transaction ID (DTID) to restrict any further transactions with the home location information database using the second transaction ID. Finally, the method includes sending a registration response message by the TR unit, to a visited location information database with the first transaction ID as the DTID to restrict the subscriber from registering with the visited location information database, based on the subscriber's profile information stored in a database associated with the TR probe.

14 Claims, 9 Drawing Sheets

U.S. PATENT DOCUMENTS

| | | | |
|---|---|---|---|
| 5,854,982 | A | 12/1998 | Chambers et al. |
| 5,901,359 | A | 5/1999 | Malmstrom |
| 5,903,832 | A | 5/1999 | Seppanen et al. |
| 5,930,701 | A | 7/1999 | Skog |
| 5,940,490 | A | 8/1999 | Foster et al. |
| 5,943,620 | A | 8/1999 | Boltz et al. |
| 5,953,653 | A | 9/1999 | Josenhans et al. |
| 5,987,318 | A | 11/1999 | Alperovich et al. |
| 5,987,323 | A | 11/1999 | Huotori |
| 5,987,325 | A | 11/1999 | Tayloe |
| 6,014,561 | A | 1/2000 | Mölne |
| 6,052,604 | A | 4/2000 | Bishop et al. |
| 6,058,309 | A | 5/2000 | Huang et al. |
| 6,075,855 | A | 6/2000 | Christiansen et al. |
| 6,085,084 | A | 7/2000 | Christmas |
| 6,138,005 | A | 10/2000 | Park |
| 6,138,009 | A | 10/2000 | Birgerson |
| 6,148,197 | A | 11/2000 | Bridges et al. |
| 6,163,701 | A | 12/2000 | Saleh et al. |
| 6,185,295 | B1 | 2/2001 | Frederiksen et al. |
| 6,185,436 | B1 | 2/2001 | Vu |
| 6,192,255 | B1 | 2/2001 | Lewis et al. |
| 6,195,532 | B1 | 2/2001 | Bamburak et al. |
| 6,208,864 | B1 | 3/2001 | Agrawal et al. |
| 6,212,372 | B1 | 4/2001 | Julin |
| 6,356,755 | B1 | 3/2002 | Valentine et al. |
| 6,356,756 | B1 | 3/2002 | Koster |
| 6,456,845 | B1 | 9/2002 | Drum et al. |
| 6,456,859 | B1 | 9/2002 | Desblancs et al. |
| 6,463,298 | B1 | 10/2002 | Sorenson et al. |
| 6,466,786 | B1 | 10/2002 | Wallenius |
| 6,505,050 | B1 | 1/2003 | Brudos et al. |
| 6,515,974 | B1 | 2/2003 | Inoue et al. |
| 6,574,481 | B1 | 6/2003 | Rathnasapathy et al. |
| 6,603,761 | B1 | 8/2003 | Wang et al. |
| 6,603,968 | B2 | 8/2003 | Anvekar et al. |
| 6,611,516 | B1 | 8/2003 | Pirkola et al. |
| 6,628,934 | B2 | 9/2003 | Rosenberg et al. |
| 6,636,502 | B1 | 10/2003 | Lager et al. |
| 6,671,523 | B1 | 12/2003 | Niepel et al. |
| 6,684,073 | B1 | 1/2004 | Joss et al. |
| 6,693,586 | B1 | 2/2004 | Walters et al. |
| 6,738,622 | B1 | 5/2004 | Stadelmann et al. |
| 6,738,636 | B2 | 5/2004 | Lielbridis |
| 6,764,003 | B1 | 7/2004 | Martschitsch et al. |
| 6,782,264 | B2 | 8/2004 | Anderson |
| 6,795,444 | B1 | 9/2004 | Vo et al. |
| 6,856,818 | B1 | 2/2005 | Ford |
| 6,876,860 | B1 | 4/2005 | Berg et al. |
| 6,920,487 | B2 | 7/2005 | Sofer et al. |
| 6,925,299 | B1 | 8/2005 | Sofer et al. |
| 6,961,559 | B1 | 11/2005 | Chow et al. |
| 6,963,543 | B2 | 11/2005 | Diep et al. |
| 6,968,383 | B1 | 11/2005 | Heutschi et al. |
| 6,975,852 | B1 | 12/2005 | Sofer et al. |
| 6,978,156 | B1 | 12/2005 | Papadopoulos et al. |
| 7,020,479 | B2 | 3/2006 | Martschitsch |
| 7,139,570 | B2 | 11/2006 | Elkarat et al. |
| 7,184,764 | B2 | 2/2007 | Raviv et al. |
| 7,231,431 | B2 | 6/2007 | Sofer et al. |
| 2002/0009199 | A1 | 1/2002 | Ala-Laurila et al. |
| 2002/0012351 | A1 | 1/2002 | Sofer et al. |
| 2002/0037708 | A1 | 3/2002 | McCann et al. |
| 2002/0087631 | A1 | 7/2002 | Sharma |
| 2002/0101858 | A1 | 8/2002 | Stuart et al. |
| 2002/0101859 | A1 | 8/2002 | Maclean |
| 2002/0160763 | A1 | 10/2002 | Mittal et al. |
| 2002/0187780 | A1 | 12/2002 | Souissi |
| 2002/0191575 | A1 | 12/2002 | Kalavade et al. |
| 2002/0196775 | A1 | 12/2002 | Huotori |
| 2003/0017843 | A1 | 1/2003 | Noblins |
| 2003/0050047 | A1 | 3/2003 | Ala-Luukko |
| 2003/0051041 | A1 | 3/2003 | Kalavade et al. |
| 2003/0064723 | A1 | 4/2003 | Thakker |
| 2003/0069922 | A1 | 4/2003 | Arunachalam |
| 2003/0129991 | A1 | 7/2003 | Allison et al. |
| 2003/0133421 | A1 | 7/2003 | Sundar et al. |
| 2003/0139180 | A1 | 7/2003 | McIntosh et al. |
| 2003/0139182 | A1* | 7/2003 | Bakkeby et al. ............. 455/432 |
| 2003/0208560 | A1 | 11/2003 | Inoue |
| 2003/0224795 | A1 | 12/2003 | Wilhoite et al. |
| 2003/0229791 | A1 | 12/2003 | De Jong |
| 2004/0019539 | A1 | 1/2004 | Raman et al. |
| 2004/0053610 | A1 | 3/2004 | Kim |
| 2004/0082346 | A1 | 4/2004 | Skytt et al. |
| 2004/0087305 | A1 | 5/2004 | Jiang |
| 2004/0120552 | A1 | 6/2004 | Borngraber et al. |
| 2004/0131023 | A1 | 7/2004 | Auterinen |
| 2004/0132449 | A1 | 7/2004 | Kowarsch |
| 2004/0148400 | A1 | 7/2004 | Mostafa |
| 2004/0196858 | A1 | 10/2004 | Tsai et al. |
| 2004/0224680 | A1 | 11/2004 | Jiang |
| 2004/0229601 | A1 | 11/2004 | Zabawskyj et al. |
| 2004/0236836 | A1 | 11/2004 | Appelman |
| 2005/0021834 | A1 | 1/2005 | Coulombe |
| 2005/0047378 | A1 | 3/2005 | Wuschke et al. |
| 2005/0064883 | A1 | 3/2005 | Heck et al. |
| 2005/0070278 | A1 | 3/2005 | Jiang |
| 2005/0186939 | A1 | 8/2005 | Barnea et al. |
| 2005/0186960 | A1 | 8/2005 | Jiang |
| 2005/0186979 | A1 | 8/2005 | McCann et al. |
| 2005/0192007 | A1 | 9/2005 | Kumar et al. |
| 2005/0192035 | A1 | 9/2005 | Jiang |
| 2005/0215250 | A1 | 9/2005 | Chava et al. |
| 2005/0232282 | A1 | 10/2005 | Silver et al. |
| 2005/0250493 | A1 | 11/2005 | Elkarat et al. |
| 2006/0003775 | A1 | 1/2006 | Bull et al. |
| 2006/0009204 | A1 | 1/2006 | Ophir |
| 2006/0025129 | A1 | 2/2006 | Wolfman et al. |
| 2006/0052113 | A1 | 3/2006 | Ophir et al. |
| 2006/0068778 | A1 | 3/2006 | Della-Torre |
| 2006/0068786 | A1 | 3/2006 | Florence |
| 2006/0079225 | A1 | 4/2006 | Wolfman et al. |
| 2006/0079236 | A1 | 4/2006 | Del Pino et al. |
| 2006/0148459 | A1 | 7/2006 | Wolfman et al. |
| 2006/0205404 | A1 | 9/2006 | Gonen et al. |
| 2006/0211420 | A1 | 9/2006 | Ophir et al. |
| 2007/0021118 | A1 | 1/2007 | Ophir et al. |
| 2007/0049269 | A1 | 3/2007 | Ophir et al. |
| 2007/0054665 | A1 | 3/2007 | Elkarat et al. |
| 2007/0072587 | A1 | 3/2007 | Della-Torre et al. |
| 2007/0178885 | A1 | 8/2007 | Lev et al. |
| 2007/0232300 | A1 | 10/2007 | Wolfman |
| 2007/0259663 | A1 | 11/2007 | Weintraub et al. |
| 2008/0020760 | A1 | 1/2008 | Elkarat et al. |

FOREIGN PATENT DOCUMENTS

| | | |
|---|---|---|
| EP | 0899 974 A2 | 3/1999 |
| GB | 2322998 | 9/1998 |
| WO | WO 00/79761 A | 12/0000 |
| WO | WO 98/26621 A2 | 6/1998 |
| WO | WO 98/26626 A2 | 6/1998 |
| WO | WO 00/18156 A1 | 3/2000 |
| WO | WO 00/51375 A | 8/2000 |
| WO | WO 00/79825 A | 12/2000 |
| WO | WO 01/22750 | 3/2001 |
| WO | WO 01/65884 | 9/2001 |
| WO | WO 02/41641 A2 | 5/2002 |
| WO | WO 02/19667 | 7/2002 |
| WO | WO 03/019960 A1 | 3/2003 |
| WO | WO 03/043367 A | 5/2003 |
| WO | WO 03/065660 A | 8/2003 |
| WO | WO 2004/081802 | 9/2004 |

| | | |
|---|---|---|
| WO | WO2004/075598 | 9/2005 |
| WO | WO2005/101857 | 10/2005 |
| WO | WO2008/012815 | 1/2008 |

OTHER PUBLICATIONS

3GPP, Dec. 2005, TS 23.060 version 5.12.0 Release 5.*
Digital cellular telecommunications system (Phase 2+); Specification of the SIM Application Toolkit for the Subscriber Identity Module-Mobile Equipment (SIM-ME) Interface (GSM 11,14 version 8.3.0 Release 1999) STSI TS 101 267 V8.3.0, XX, XX, Aug. 2000, pp. 1-69 and pp. 114-115 (XP-002222021).
"Digital Cellular Telecommunications system (Phase 2+); Universal Mobile Telecommunications system (UMTS); General Packet Radio Service (GPRS) Service description; Stage 2 (3GPP TS 23.060 Version 5.4.0 Release 5)" ETSI TS 123 060 V5.4.0, Dec. 2002, pp. 1-207 (XP-014007573).
"Digital Cellular Telecommunications system (Phase 2+); Universal Mobile Telecommunications system (UMTS); General Packet Radio Service (GPRS); GPRS Tunnelling Protocol (GTP) across the Gn and Gp Interface (3GPP TS 29.060 version 5.4.0 Release 5)" ETSI TS 129 060 V5.4.0, Dec. 2002. pp. 1-102 (XP-002298277).
Ala-Laurila, et al., "Wireless LAN Access Network Architecture for Mobile Operators," IEEE Communications Magazine, Nov. 2001, pp. 82-89 (XP-001107810).
Brunen, M. "Roaming im Zugangsnetz Mit OWLAN uberall zu Hause sein,"Net-Zeitschrift Fuer Kommunikationsmangement, Huthig Verlag, Heilderberg, 2002, pp. 39-42 (XP-001122438).
GSM Association Permanent Reference Document: IR.33, PRD IR.33 "GPRS Roaming Guidelines," version 3.2.0, Apr. 3, 2003, pp. 1-20 (XP-002298278).
Ostrowski, F., "Roaming und Handover zwischen UMTS und Funk-LA," NTZ (Nachrichtentechnische zeitschrift), 2002, pp. 24-26 (XP-001132263).
Telenor (origin GSMA), "Inter-PLMN Backbone Guidelines," S3z000005 3GPP TSG SA WG3 Security—S3#15bis, Ad-Hoc Meeting Nov. 8, 2000, pp. 1-30 (XP-002298276).
"Universal Mobile Telecommunications system (UMTS) NAS Functions Related to Mobile Station MS in Idle Mode" ETSI TS 123 122 V3.1.0, Jan. 2000, pp. 1-33.
"Digital Cellular Telecommunications System (Phase 2+) GSM; Univeral Mobile Telecommunications System (UMTS); Mobile Radio Interface Layer 3 Specification; Core Network Protocols, Stage 3" ETSI TS 124 008 V3.2.1, Jan. 2000, pp. 62-69 and 376.
Salman A. Baset et al., "An analysis of the Skype Peer-to-Peer Internet Telephony Protocol", Department of Computer Science, Sep. 15, 2004, 12 pages.
Salkintzis, et al., "WLAN-GPRS Integration for Next-Generation Mobile Data Networks," IEEE Wireless Communications, Oct. 2002, pp. 112-123 (XP-001132263).
Michael Mouly, "The GSM System for Mobile Communications", pp. 103-104. Cell and Sys, 1992.
GSM 378 on CAMEL Digital Cellular telecommunications system (Phase 2+);Customized Applications for Mobile network Enhanced Logic (CAMEL) Phase 2; Stage 2 (GSM 03.78 version 6.7.0 Release 1997).
GSM978 on CAMEL Application protocol Digital cellular telecommunications system (Phase 2+); Customized Applications for Mobile network Enhanced Logic (CAMEL); Camel Application Part (CAP) specification (GSM 09.78 version 7.1.0 Release 1998).
GSM 902 on MAP Specification Digital Cellular Telecommunications (Phase 2+); Mobile Application Part (MAP) Specification (3GPP TS 09.02 version 7.9.0 Release 1998).
Q760-Q769 on ISUP Signaling, Function and Procedure.
Q.761 (Functional description of the ISDN User Part of CCITT Signaling System No. 7).
Q762 (General Functions of CCITT Signaling System No. 7 ISDN User Part Messages and parameters).
Q 763 (Formats and codes of CCITT Signaling System No. 7 ISDN User Part Message and parameters).
Q 764 (1999), Signaling System No. 7—ISDN User Part signaling procedures.
Q 730 (1999), ISDN User Part supplementary services.
Q 711 (1996), Functional description of signaling connection control part.
Q 712 (1996), Definition and function of signaling connection control part messages.
Q713 (1996), Signaling connection control part formats and codes.
Q 714 (1996), Signal connection control part procedures.
Q 716 (1993), Signaling Connection Control Part (SCCP) performance.
GSM 340 on SMS Digital cellular telecommunications system (Phase 2+); Technical realization of the Short Message Service (SMS); (GSM 03.40 version 7.4.0 Release 1998).
SMPP Forum: SMPP Protocol Document Version:—Oct. 12, 1999 Issue 1.2.
Universal Mobile Telecommunications System (UMTS); Multimedia Messaging Service (MMS), Functional description; Stage 2 (3GPP TS 23.140 version 4.2.0 Release 4).
GSM 379 on CAMEL Digital cellular telecommunications system (Phase 2+); Customized Applications for Mobile network Enhanced Logic (CAMEL); Camel Application Part (CAP) specification (GSM 09.78 version 7.1.0 Release 1998).
Technical Specification 3$^{rd}$ Generation Partnership Project; Technical Specification Group Services and System Aspects; Service accessibility (Release 1999).
Signaling procedure and the Mobile Application Part (MAP) (Release 1999).
Q1214-Q1218 on Intelligent Networks IMS architectures, 3GPP, and 3GPP2.
GMS 408 on radio interface layer 3; Digital cellular telecommunications system (Phase 2+); Mobile radio interface layer 3 specification (GSM 04.08 version 7.4.2 Release 1998).
GSM 322 network selection Digital cellular telecommunications system (Phase 2+); functions related to Mobile Station (MS) in idle mode and group receive mode (GSM 03.22 version 8.3.0 Release 1999).
GSM 23122 network selection 3GPP TS 23.122 V3.9.0 (Dec. 2002) Technical Specification; 3$^{rd}$ Generation Partnership Project; Technical Specification Group Core Network; NAS Functions related to Mobile Station (MS) in idle mode (release 1999).
GSM 22011 service accessibility; 3 GPP TS 22.011 V3.8.0 (Sep. 2002) Technical Specification; 3$^{rd}$ Generation Partnership Project; Technical Specification Group Services and System Aspects; Service accessibility (Release 1999).
3 GPP 29010; 3 GPP TS 29.010 V3.10.0 (Dec. 2002) Technical Specification; 3$^{rd}$ Generation Partnership Project; Technical Specification Group Core Network; Information element mapping between Mobile Station—Base Station System (MS-BSS) and Base Station System—Mobile-services Switching Centre (BSS—MSC).
GSM 318 on CAMEL Basic Call Handling; Digital cellular telecommunications system (Phase 2+) Basic call handling; Technical realization (GSM 03.18 version 6.6.0 Release 1997).
ITU-T Recommendation Q. 766 (1993), Performance objectives in the integrated services digital network application.
ITU-T Recommendation Q. 765 (1998), Signaling system No. 7—Application transport mechanism.
ITU-T Recommendation Q. 769.1 (1999), Signaling system No. 7—ISDN user part enhancements for the support of Number Portability.
Q771-775X TCAP.
GSM 1111 SIM and Mobile Interface.
GSM 1114 SIM Toolkit.
IR 7320 Steering of Roaming.
GSM 348 Security and OTA.
GSM 31048 Security and OTA.
GSM 23119 Gateway Location Register.
GSM 408 Mobile Radio Interface Network Layer.
GSM 23122 Mobile Station Procedure.
GSM 24008 Mobile Radio Interface Network Layer.
GSM 25304 Idle Mode Selection.
GSM 29010 Error Network Mapping.
GSM 29002 MAP Protocol.
3G TS 22.078 version 3.2.0 Release 1999 UMTS CAMEL.
3G TS 23.278 version 6.0.0. Release 6 UMTS CAMEL-IMS interworking.

GSM 360 GPRS.
GSM 960 GPRS Tunneling Protocol.
GSM 23060 GPRS.
GSM 29060 GPRS Tunneling Protocol.

GSM 23012 Location Update.
Q701-705 on SS7 MTP.

* cited by examiner

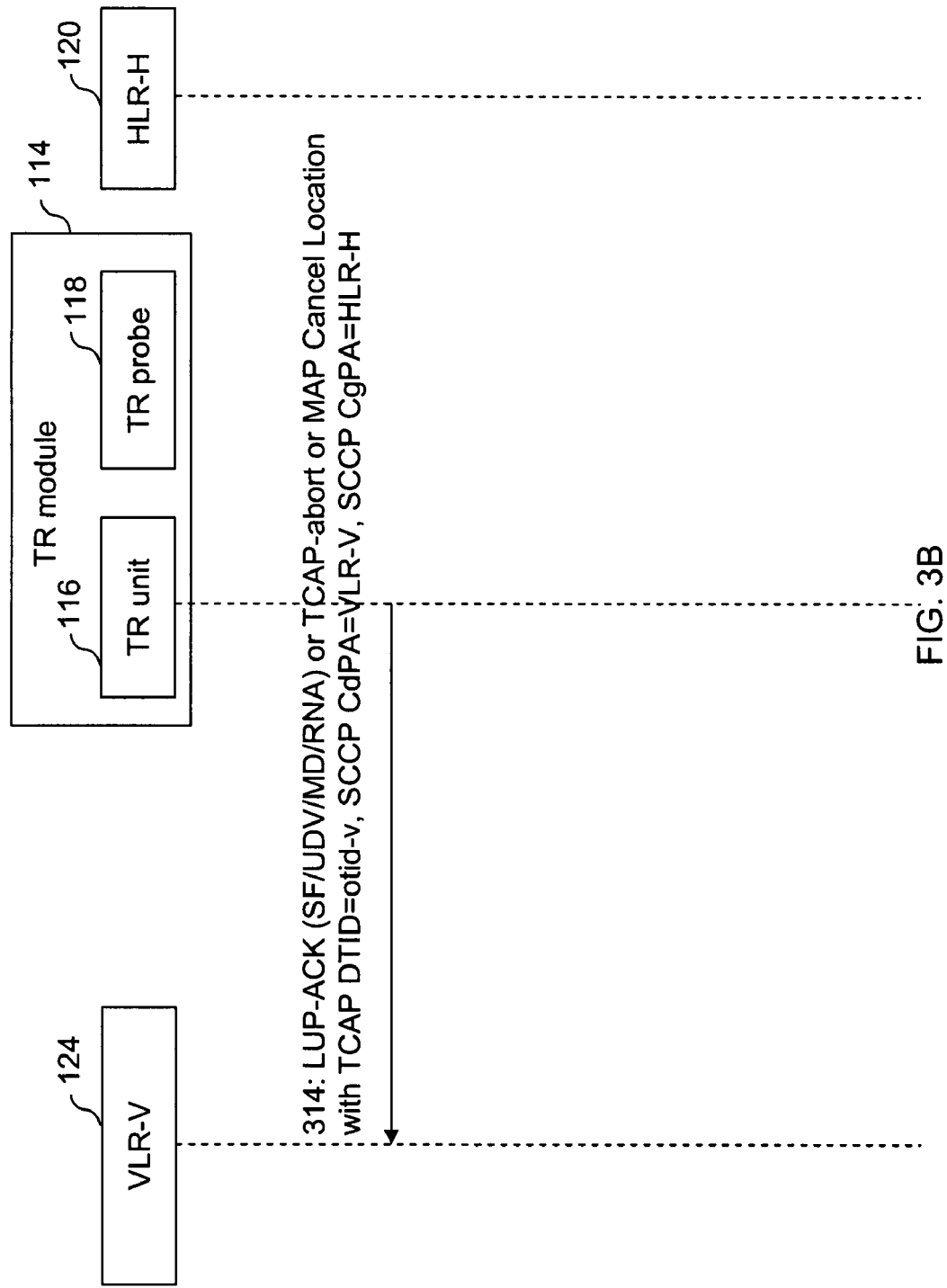

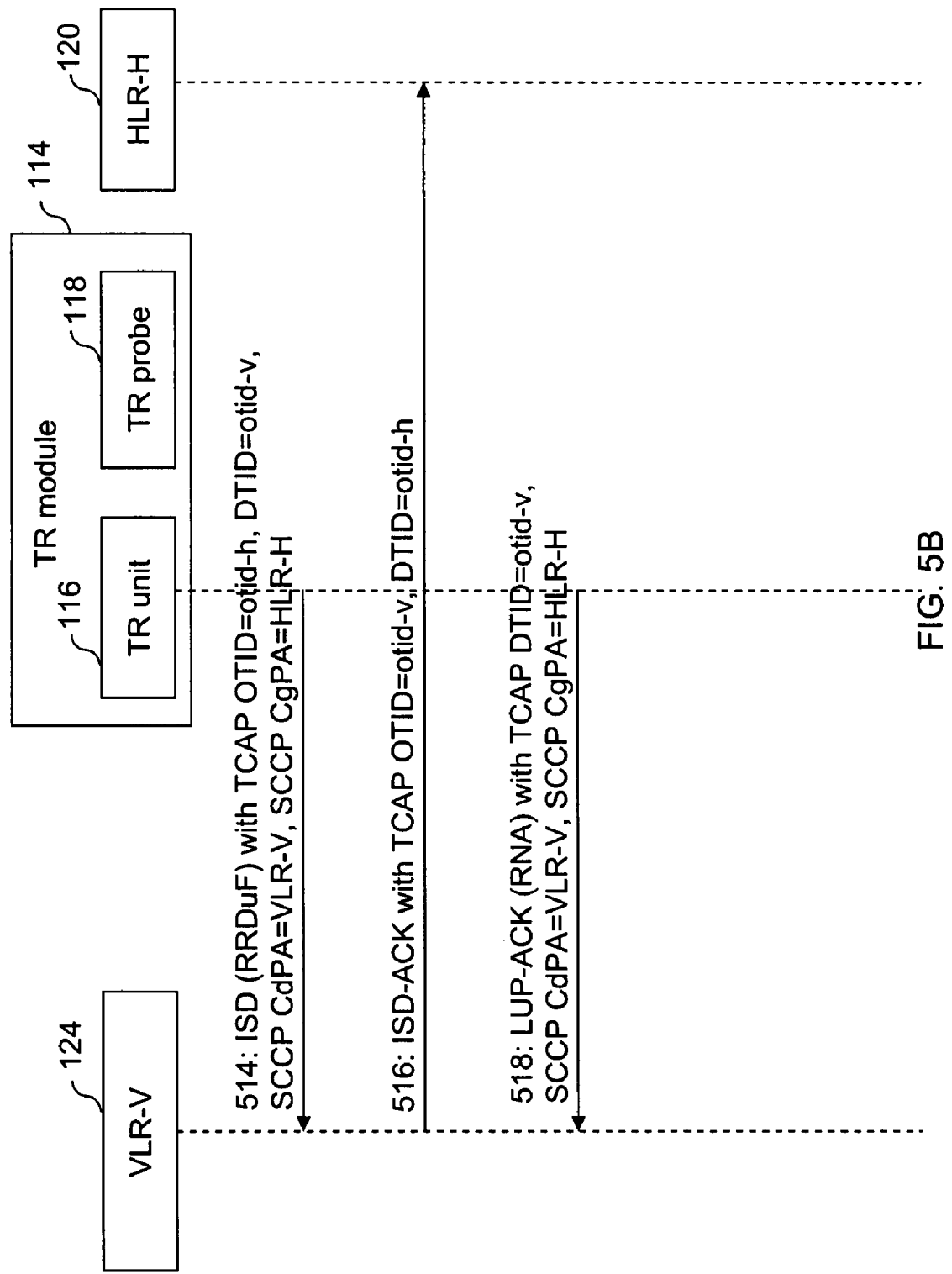

METHOD AND SYSTEM FOR PROVIDING GSMA IR. 73 SOR COMPLIANT CELLULAR TRAFFIC REDIRECTION

RELATED APPLICATIONS

This application claims the benefit of U.S. Provisional Application No. 60/800,034 entitled "IR-73 Compliant Traffic Redirection in Monitoring" filed on May 15, 2006. Further, this application is a continuation-in-part of U.S. patent application Ser. No. 10/635,804 entitled "Method And System For Cellular Network Traffic Redirection" filed on Aug. 5, 2003, now U.S. Pat. No. 7,072,651. The aforementioned patent applications are incorporated herein by this reference in their entireties.

FIELD OF THE INVENTION

The present invention generally relates to subscribers roaming in different communication networks. More specifically, the invention relates to redirecting subscriber's roaming traffic while they are attempting to associate with a visited network.

BACKGROUND OF THE INVENTION

Different network operators within almost every country around the world deploy common carrier mobile communication systems. Many of these network operators, form roaming partnerships to offer international roaming to their subscribers traveling abroad, and to travelers visiting their territory and using their foreign mobile phones. Some of the home network operators often have preferred bilateral roaming agreements with some visited network operators. The preference is based on either more favorable wholesale roaming charges (or discounts) or more profits for the home network operator than that of non-preferred network operators. Therefore, "preferred" networks are those networks that the home network operator prefers its outbound roamers to register with when traveling outside their home coverage area. Non-preferred networks are also termed as "non-benefiting" networks.

Network operators can maximize their margins and the roamers can get more attractive roaming rates and services, if the roamers roam in the home network operator's preferred networks. When the roamers roam into a zone outside their home network's (i.e. an HPMN) coverage area, they may attempt to register with one or more visited networks (i.e. VPMNs), one at a time, based on various criteria. One or more of these VPMNs may also include the "non-preferred" VPMNs. Hence, protecting the existing roaming revenues and growing them further has become an important priority for various network operators worldwide.

However, current methods of controlling which network the subscriber registers with when he/she is roaming have certain limitations. For example, a commonly used approach includes storing a list of preferred networks on a SIM in the subscriber's handset. However, this list often get outdated as many of the home network operators may tie up roaming agreements with several other visited network operators after the SIM has already been sold to subscribers or SIM vendors. Although, there are techniques to update this SIM list using Over-The Air (OTA) approach, however, the OTA update requires OTA support by the SIMs and in many cases the SIMs do not have such support. Also, the SIM list approach is not quick enough to adapt to the dynamic and distributed nature of preferred relationships between the HPMN operator and the VPMN operators in different countries.

Another approach, as taught by the inventor of U.S. application Ser. No. 7,072,651, filed on Aug. 5, 2003, describes a method and system for redirecting wireless network traffic and voice and data traffic under control of a network operator when a subscriber is roaming. This previous filing presented an innovative solution in a GSM network environment for redirecting an outbound subscriber's traffic (i.e. Traffic Redirection) to a preferred network, based on some distribution control. This solution is based on MAP signaling and is deployed at operator's HPMN that provides a SIM independent solution. It also known that the TR solution can be combined with the OTA approach in order to achieve better results of redirecting the subscriber's traffic to the preferred network.

In this previous TR filing, the solution for Traffic Redirection (TR) or Steering of Roaming (SoR) was presented in two approaches: an in-signaling based approach (also referred to as active mode) and a passive monitoring based approach (also referred to as passive mode). All location update attempts by the subscriber in a VPMN are received at a Visitor Location Register (VLR) in the VPMN. The VLR then sends a MAP Location Update (LUP) message to a Home Location Register (HLR) in the subscriber's HPMN. In the active mode, these LUP messages are redirected through the HPMN deployed TR solution, which decides whether to send a reject error message to the VLR, or simply redirect the LUP message to the HLR. In an alternate technique, based on the passive mode, the HPMN deployed TR solution monitors the LUP message by tapping on a signaling link (e.g., roaming SS7 link), from the VLR of the VPMN to the HLR of the HPMN, and thereby decides whether to send a reject error message to the VLR of the VPMN.

Since the previous TR filing, Global System for Mobile communication Association (GSMA) introduced IR.73 SoR Implementation Guidelines for implementing traffic redirection. The purpose of the guideline, with respect to the previous TR filing, is to reduce the impact of the HPMN deployed TR solution on the "non-preferred" VPMNs (i.e. the rejected VPMNs) that may be rejected due to some distribution control. Moreover, the IR.73 guideline applies to both: active mode and passive mode. Hence, both approaches are required to follow the IR.73 guideline, which teaches that the HPMN should do its best not to send any further messages, after a location update acknowledgement message (i.e. LUP-ACK message) has already been sent to the VPMN, using same transaction id. In other words, during a location update process using a particular transaction id, the HPMN should not send any message after sending the LUP-ACK message, which according to the GSM standards is the final message in the location update process.

The active mode of the previous TR filing clearly followed the IR.73 guideline by not sending any MAP/TCAP messages after LUP-ACK message. However, the passive mode approach of the previous TR filing may not conform to the IR.73 guideline when the HPMN's HLR sends a MAP ISD message or a MAP LUP-ACK message to the VPMN VLR, after the HPMN has already sent a reject error message in the LUP-ACK message to the VPMN VLR, using the same transaction ID. In addition, in passive mode of the previous TR filing, only System Failure (SF), Unexpected Data Value (UDV), Missing Data (MD), and TCAP/MAP abort were considered as an error codes. Moreover, the passive mode of the previous TR filing, did not handle error codes like Roaming Restricted Due to Unsupported Feature (RRDuF) and Roaming Not Allowed (RNA).

In accordance with the foregoing, there is a need in the art of a system, method, and a computer product, which provides a passive mode TR solution that is compliant with GSMA IR.73 guidelines, and is able to handle additional error codes like RRDuF and RNA to restrict the subscriber from registering with non-preferred networks.

SUMMARY

The present invention is directed to provide a passive monitoring method of redirecting roaming traffic associated with a subscriber. The method includes retrieving a first transaction ID at a TR probe by passively (i.e. non-intrusively tapping signaling path of a roaming transaction) monitoring a registration message intended for a home location information database. The method further includes retrieving a second transaction ID at the TR probe, by passively monitoring an update message originating from the home location information database. Further, the method includes sending an abort message by a TR unit, to the home location information database with the second transaction ID as a Destination Transaction ID (DTID) to restrict any further transactions with the home location information database using the second transaction ID. Finally, the method includes sending a registration response message by the TR unit, to a visited location information database with the first transaction ID as the DTID to restrict the subscriber from registering with the visited location information database, based on the subscriber's profile information stored in a database associated with the TR probe.

Another aspect of the invention presents a system for redirecting roaming traffic associated with a subscriber. The system includes a TR probe coupled to the first network. The TR probe retrieves a first transaction ID by passively monitoring a registration message intended for a home location information database. The TR probe further retrieves a second transaction ID by passively monitoring an update message originating from the home location information database. The system further includes a TR unit coupled to the first network. The TR unit sends an abort message to the home location information database with the second transaction ID as a Destination Transaction ID (DTID) to restrict any further transactions with the home location information database using the second transaction ID. Further, the TR unit sends a registration response message to a visited location information database with the first transaction ID as the DTID to restrict the subscriber from registering with the visited location information database, based on the subscriber's profile information stored in a database associated with the TR probe.

Another aspect of the present invention provides a computer program product including a computer usable program code for redirecting roaming traffic associated with a subscriber by retrieving a first transaction ID at a TR probe, by passively monitoring a registration message intended for a home location information database. Thereafter, retrieving a second transaction ID at the TR probe, by passively monitoring an update message originating from the home location information database. Further, sending an abort message by a TR unit, to the home location information database with the second transaction ID as a Destination Transaction ID (DTID) to restrict any further transactions with the home location information database using the second transaction ID. Finally, sending a registration response message by the TR unit, to a visited location information database with the first transaction ID as the DTID to restrict the subscriber from registering with the visited location information database.

BRIEF DESCRIPTION OF DRAWINGS

In the drawings, the same or similar reference numbers identify similar elements or acts.

FIGS. 3A and 3B is a flow diagram representing the TR solution to restrict the subscriber from registering with a VPMN using RNA as an error code, in accordance with a first embodiment of the present invention;

FIGS. 5A and 5B is a flow diagram representing the TR solution to restrict the subscriber from registering with a VPMN using RNA and RRDuF as the error codes when a VLR in the VPMN doesn't follow the GSM 23.102 standard, in accordance with a third embodiment of the present invention.

DETAILED DESCRIPTION

In the following description, for purposes of explanation, specific numbers, materials and configurations are set forth in order to provide a thorough understanding of the invention. It will be apparent, however, to one having ordinary skill in the art, that the invention may be practised without these specific details. In some instances, well-known features may be omitted or simplified, so as not to obscure the present invention. Furthermore, reference in the specification to "one embodiment" or "an embodiment" means that a particular feature, structure or characteristic, described in connection with the embodiment, is included in at least one embodiment of the invention. The appearance of the phrase "in an embodiment", in various places in the specification, does not necessarily refer to the same embodiment.

The present invention provides a system, method, and a computer program product for redirecting roaming traffic associated with a subscriber. The system describes a passive monitoring based approach to restrict the roaming subscriber from registering with a non-preferred VPMN network, while complying with the IR.73 guideline. Further, the IR.73 compliant TR solution provides a method by which the HPMN can send error codes, such as Roaming Restricted Due to Unsupported Feature (RRDuF) and Roaming Not Allowed (RNA), to restrict the subscriber from registering with the non-preferred networks, in addition to the error codes such as System Failure (SF), Unexpected Data Value (UDV, and Missing Data (MD).

Figure 1:
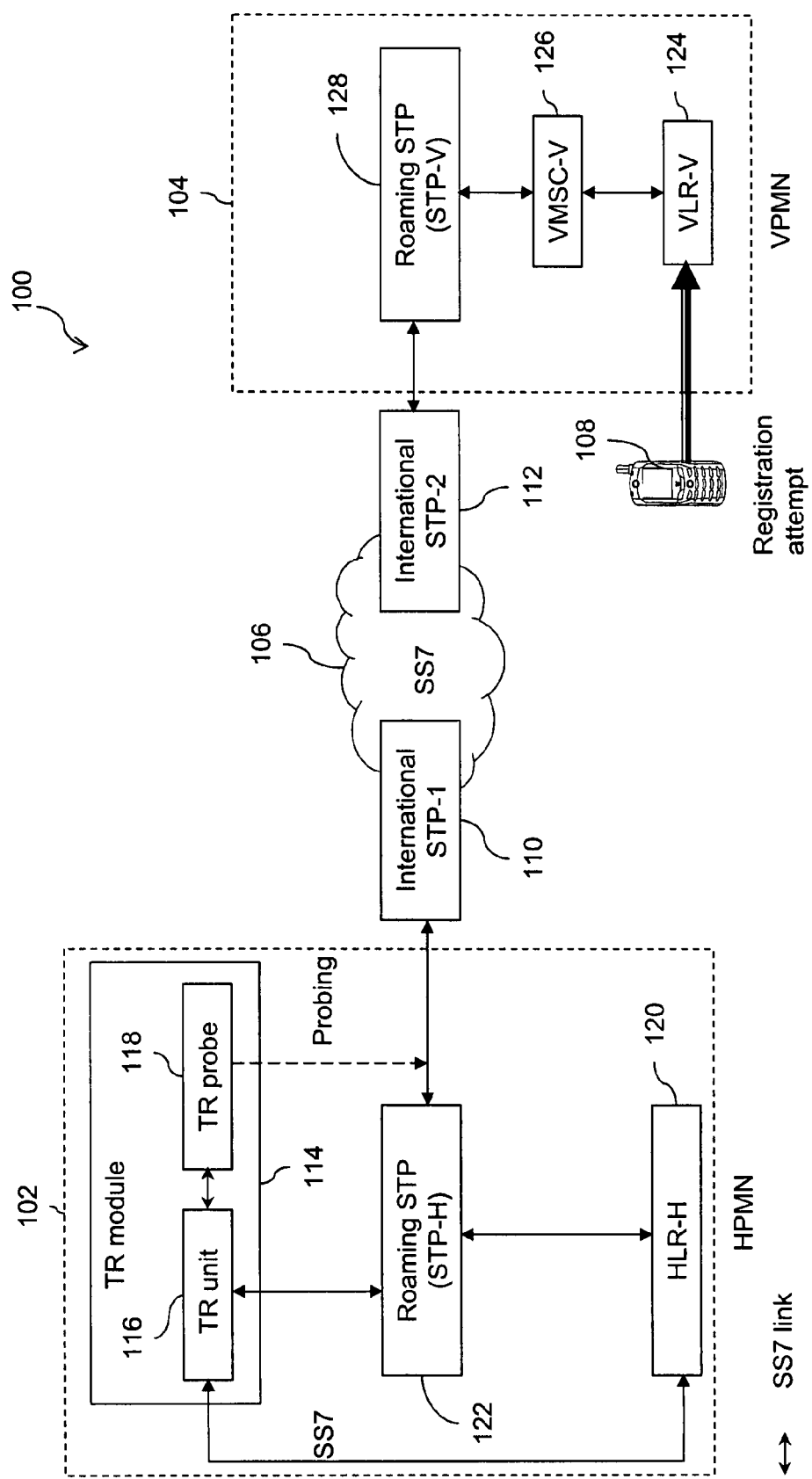
FIG. 1 represents a system for providing an IR.73 compliant Traffic Redirection (TR) solution, in accordance with an embodiment of the present invention.

FIG. 1 represents a system for providing the IR.73 compliant Traffic Redirection (TR) solution. The system includes an HPMN 102 and a VPMN 104, exchanging signaling via Signaling System 7 (SS7) network 106. A subscriber 108 who has HPMN 102 as his home network, attempts to register with VPMN 104. In one embodiment of the present invention, HPMN 102 is a first network and VPMN 104 is a second network. SS7 network 106 further consists of an international STP-1 110 and an international STP-2 112. STP1 and STP2 are packet switches that route network traffic between HPMN 102 and VPMN 104. It will be apparent to a person skilled in the art that an STP routes incoming SS7 message based on the routing information contained in the SS7 message. Further, HPMN 102 includes a TR module 114 for implementing the IR.73 compliant TR solution. TR module 114 further includes a TR unit 116 and a TR probe 118 for sending one or more MAP message to redirect subscriber's roaming traffic, and monitoring MAP messages by probing an SS7 link between HPMN 102 and VPMN 104, respectively. HPMN 102's deployed TR unit 116 and TR probe 118 collectively refer to as TR module 114 for providing the TR solution. In accordance with various embodiments of the present invention, HPMN 102 uses the TR solution to prevent subscriber 108 from registering with VPMN 104 (a non-preferred network).

HPMN 102 further includes a Home Location Register (HLR) 120, and a roaming Signal Transfer Point (STP) 122. Since HLR 120 and roaming STP 122 reside in HPMN 102, they are hereinafter referred to as an HLR-H 120 and a STP-H 122, respectively. HLR-H 120 is interchangeably, referred to as home location information database. TR unit 116, TR probe 118, HLR-H 120, and roaming STP-H 122 are interconnected, and communicate with each other via the SS7 link. System 100 further includes in VPMN 104 a Visited Location Register (VLR) 124, a Visited Mobile Switching Center (VMSC) 126, and a roaming Signal Transfer Point (STP) 128. Since VLR 124, VMSC 126, and roaming STP 128 reside in VPMN 104, they are hereinafter referred to as a VLR-V 124, a VMSC-V 126, and a STP-V 128, respectively. VLR-V 124 is interchangeably referred to as visited location information database. VLR-V 124, VMSC-V 126, and roaming STP-V 128 are interconnected, and communicate with each other via an SS7 link. It would be apparent to a person skilled in the art that any network element in HPMN 102 and VPMN 104 may communicate with each other via SS7 network 106. The network elements in HPMN 102 use international STP-1 110 as an interface on SS7 network 106, to communicate with the network elements in VPMN 104. While, the network elements in VPMN 104 use international STP-2 112 as an interface on the SS7 network 106 communicate with the network elements of HPMN 102. Moreover, it would be apparent to a person skilled in the art that HPMN 102 and VPMN 104 may also include various other network components (not shown in FIG. 1) depending on the architecture under consideration.

Since a previous TR filing, as taught by the inventor of U.S. patent application Ser. No. 10/635,804 entitled "Method and System for Cellular Network Traffic Redirection", GSMA introduced IR.73 implementation guideline for Steering of Roaming (SoR). The objective of the GSMA IR.73 guideline is to reduce the impact caused by HPMN 102 deploying the TR solution on one or more rejected or non-preferred VPMNs. Steering of Roaming (SoR) is one of the techniques used to redirect subscriber's roaming traffic to a preferred network. The preferred network can be a network from a list of preferred Public Land Mobile Networks (PLMNs) embedded on a SIM card inside the subscriber's handset. One of the techniques of embedding this preferred list on the subscriber's SIM card uses an Over-The-Air (OTA) transfer from the HPMN's end. Hence, the HPMN operator can redirect the subscriber by updating the PLMN list regardless of the location of the subscriber, thus forcing him to register with the preferred network. These techniques have been described in detail in the previous TR filing.

The IR.73 SoR implementation guideline states:

QUOTE:
"The only MAP operation recommended for use with SOR is 'Update Location'. The HPLMN must implement SOR on this MAP procedure and shall only send one response for each 'Update Location' operation. For clarity in the interpretation of the preceding sentence, a MAP-InsertSubscriberData-Operation (TC-Invoke) shall not be counted as a response to the MAP-UpdateLocation-Operation (TCInvoke). The HPLMN should do its best to send TC-components in the order as defined in 29.002 v 3.20.0 Section 19.1 (Location Management). Therefore the HPLMN should not transmit, with the same transaction identities, a MAP-InsertSubscriberData Operation (TC-Invoke in TC-Continue) after sending the MAP-UpdateLocation response (TC result/Error/Reject/Abort in TC-End/TC-Abort)."

UNQUOTE

In other words, the IR.73 guideline states that the HPMN should ensure not to send any further messages after a location update response message (i.e. LUP-ACK message), being already sent to the VPMN using a same transaction id. The IR.73 guideline applies for both active mode TR and passive mode TR. Since in the active mode TR, HPMN 102 sends only one location update response message (i.e. LUP-ack) to VPMN 104 for each location update message (i.e. MAP LUP message), the previous TR filing conformed to the IR.73 guideline. However, the passive mode TR of previous TR filing did not comply with the IR.73 guideline, since HLR-H 120 was sending a MAP ISD message to VLR-V 124, when TR unit 116 had already sent the location update response message (i.e. LUP-ACK, which is also referred as registration response message). It will be apparent to a person skilled in the art that the LUP message and ISD message are essentially Mobile Application Part (MAP) signaling messages.

It will also be obvious to a person skilled in the art that all MAP messages, such as, but not limited to, LUP, ISD, Delete Subscriber Data (DSD), and Cancel Location are sent over TCAP transactional protocol. TCAP is capable of controlling many active dialogues simultaneously. Moreover, each of these active dialogues are assigned a unique transaction ID, to correlate/track various messages in a dialogue session. TCAP generally uses two transaction values, one assigned at the originator of a message (also termed as Origination Transaction ID, OTID) and the other assigned at the destination of this message (also termed as Destination Transaction ID, DTID).

In accordance with one embodiment of the present invention, in the passive monitoring based approach, TR probe 118 monitors exchange of various MAP messages associated with subscriber 108 between VPMN 104 and HPMN 102. By monitoring these MAP messages, HPMN 102 deploying the TR solution decides whether to send a reject error message to VLR-V 124 in order to thwart the subscriber's registration attempt with VPMN 104. Also, TR unit 116 is able to prevent the HLR-H 120 from sending any further messages after the LUP-ACK message. This ensures that the IR.73 guideline is not violated. Hence, HPMN 102's operator is able to redirect the subscriber's roaming traffic to a preferred network, based on the distribution control.

In order to meet the above-mentioned objectives, TR probe 118 monitors the signaling messages on both forward path (i.e., the SS7 link from VLR-V 124 to HLR-H 120), and return path (i.e., the SS7 link from HLR-H 120 to VLR-V 124). It will be apparent to a person skilled in the art that the signaling messages are tracked using their corresponding transaction ids for a set of messages defining a complete transaction. Hence, TR probe 118 monitors the signaling messages with a first transaction ID on the forward path, and the signaling messages with a second transaction ID on the return path. Also, TR probe 118 can capture MCC and MNC codes while monitoring the signaling messages with the first transaction ID on the forward path. The first transaction ID corresponds to transaction ID of messages sent from VLR-V 124, in order to interact with various components in HPMN 102 and VPMN 104. The second transaction ID corresponds to transaction ID of messages sent from HLR-H 120, in order to interact with various components in HPMN 102 and VPMN 104. For ease of further reference, the first transaction ID and the second transaction ID are interchangeably referred to as otid-v and otid-h, respectively. Furthermore, TR module 114 stores the otid-v, the otid-h, the subscriber's profile information, and one or more parameters, such as, but not limited to, MCC and MNC codes and a list of preferred VPMNs, in a database associated with TR module 114.

In accordance with an embodiment of the present invention, TR probe 118 can capture the first transaction id (i.e. otid-v) by passively monitoring a registration message (i.e. LUP message), on the forward path from VLR-V 124 to HLR-H 120, when subscriber 108 attempts to register with VPMN 104. TR probe 118 can capture the second transaction id (i.e. otid-h), by passively monitoring an update message (i.e. ISD message) on the return path from HLR-H 120 to VLR-V 124. In one embodiment of the present invention, TR unit 116 uses the otid-h to abort the HLR-H transactions. In addition, TR unit 116 may also send reject error messages to VLR-V 124, after TR module 114 determines VPMN 104 to be a non-preferred network.

In accordance with another embodiment of the present invention, TR unit 116 sends one or more messages in order to prevent subscriber 108 from registering with VPMN 104. In an embodiment of the present invention, TR unit 116 sends a registration response message, such as, but not limited to, an LUP ACK message, a Transaction Capabilities Application Part (TCAP) Abort message, and a Mobile Application Part (MAP) Cancel Location message, to VLR-V 124. TR unit 116 can send one of these registration response messages to VLR-V 124 once it has sent an abort message, using otid-h to HLR-H 120, in order to abort any further transactions with HLR-H 120 using otid-h. TR unit 116 can also send the LUP-ACK message with an error code such as, but not limited to, SF, UDV, MD, and RNA. The call flow implementing this embodiment is explained later in conjunction with FIGS. 3A and 3B. In another embodiment of the present invention, TR unit 116 can send an update message (i.e. ISD message) with an error code, such as a Roaming Restriction Due to Unsupported Feature (RRDuF), and then send the LUP-ACK message to restrict subscriber 108 from registering with VPMN 104. The call flow implementing this embodiment is explained later in conjunction with FIGS. 4A and 4B. In yet another embodiment of the present invention, TR unit 116 can send LUP-ACK message with an error code, such as Roaming Not Allowed (RNA), after it has sent the ISD message with the error code RRDuF to VLR-V 124. The call flow implementing this embodiment is explained later in conjunction with FIGS. 3A and 3B.

Figure 2A:
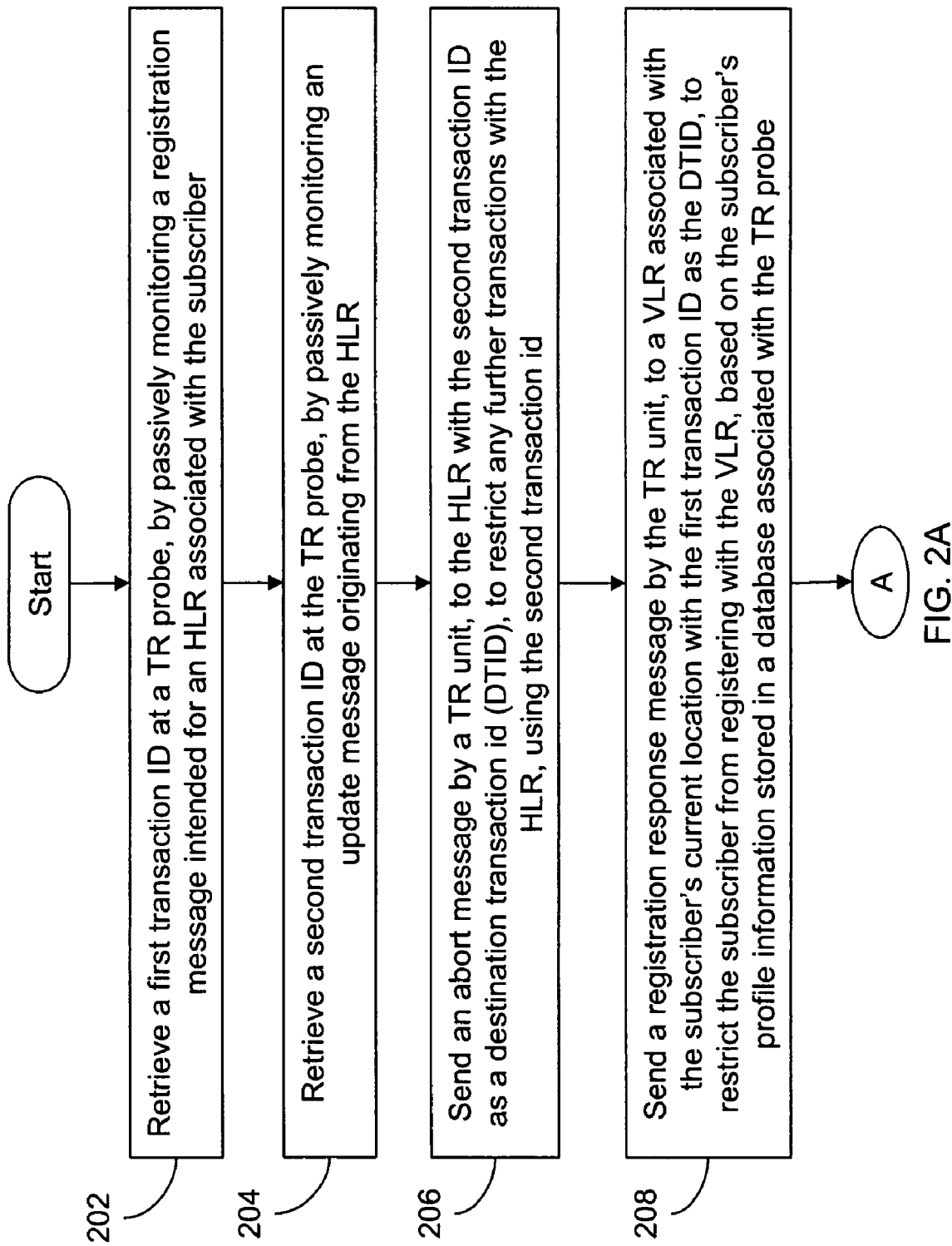
FIGS. 2A and 2B represent a flowchart for providing the TR solution, in accordance with an embodiment of the present invention.
Figure 2B:
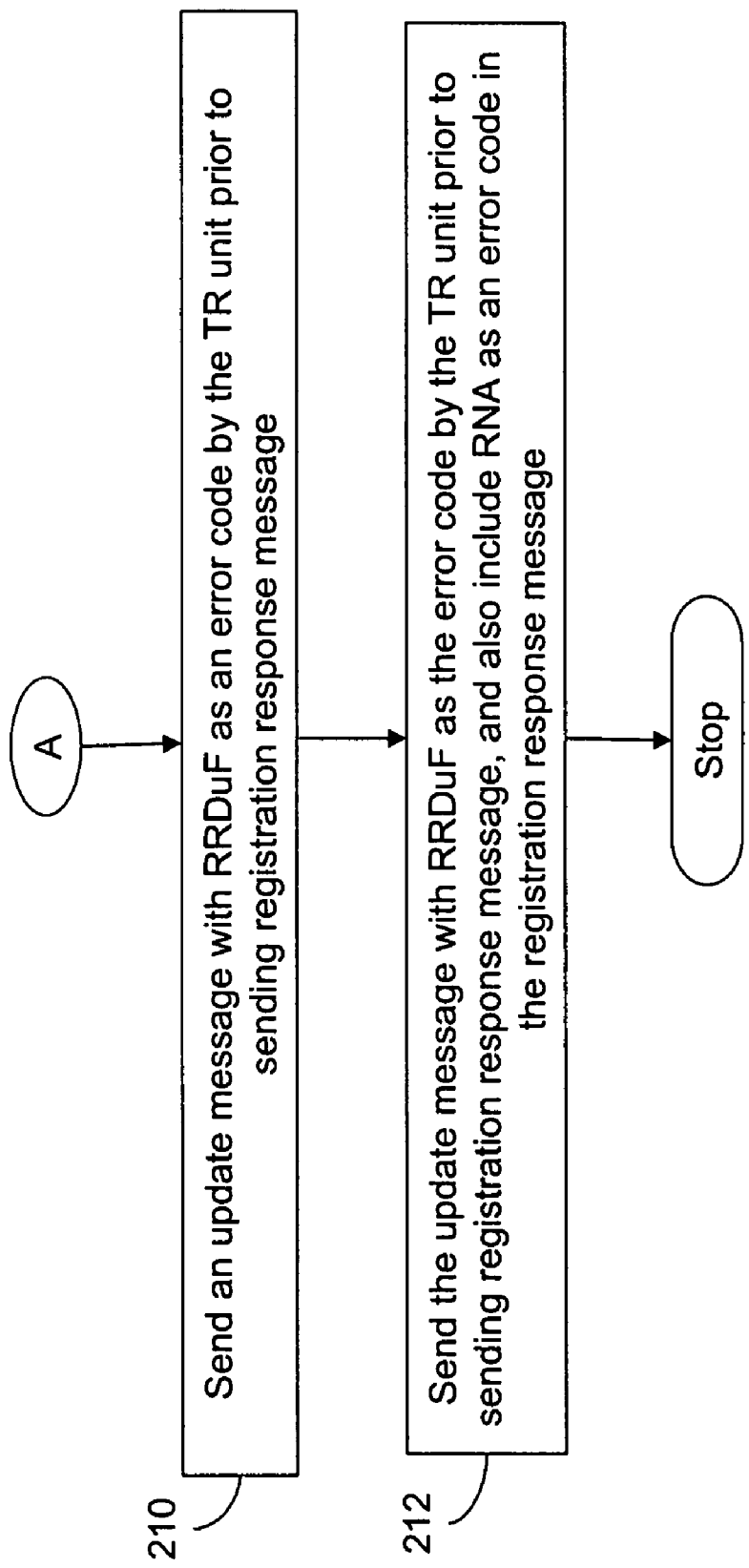

FIGS. 2A and 2B represent a flowchart for providing the TR solution, in accordance with an embodiment of the present invention. At step 202, the TR probe retrieves a first transaction ID (i.e. otid-v), by passively monitoring a registration message from a VLR intended for an HLR associated with the subscriber. In an embodiment of the present invention, TR probe 118, at step 202, retrieves the otid-v by tapping the LUP message from VLR-V 124 to HLR-H 120 during the subscriber's registration attempt. Thereafter, at step 204, the TR probe retrieves a second transaction ID by passively monitoring an update message originating from the HLR towards the VLR. In an embodiment of the present invention, TR probe 118, at step 204, retrieves the otid-h by tapping the ISD message from HLR-H 120 to VLR-V 124, received after the LUP message. In one embodiment of the present invention, TR probe 118, prior to performing step 204, re-captures the otid-v, sent as the DTID in the update message (i.e. ISD message) originating from HLR-H 120. HLR-H 120 may send this ISD message after receiving the LUP message at step 202. This otid-v is recaptured in order to correlate it with the earlier retrieved otid-v (at step 202), from the LUP message. This is done in order to ensure that the ISD message being monitored belongs to the same location update process that was initiated by the LUP message. Once, the otid-v is correlated, TR probe 118 retrieves the otid-h at step 204.

Thereafter, at step 206, TR unit sends an abort message to the HLR with the second transaction ID as a destination transaction id (DTID), to restrict any further transactions from and to the HLR, using the second transaction ID. In an embodiment of the present invention, TR unit 116, at step 206, sends a TCAP-abort message to HLR-H 120 with DTID=otid-h to abort receipt of any further messages with DTID=otid-h at HLR-H 120, and also to restrict HLR-H 120 from sending any further messages with OTID=otid-h. Thereafter, at step 208, the TR unit sends a registration response message to a VLR of the VPMN with the first transaction ID as the DTID, to restrict the subscriber from registering with the VLR, based on the subscriber's profile information, stored in a database associated with the TR module. In an embodiment of the present invention, TR unit 116, at step 208, sends the registration response message to VLR-V 124 with DTID=otid-v, to restrict subscriber 108 from registering with VLR-V 124 (in VPMN 104). In an embodiment of the present invention, TR module 114 maintains a list of preferred networks in the database associated with TR module 114. The subscriber's registration with VLR-V 124 is not restricted if VPMN 104 is determined to be present in the list of preferred networks. As HPMN 102 sends a single registration response message (i.e. LUP-ACK or TCAP-abort or MAP CancelLoc) to VLR-V 124, in response to the LUP message, the location update procedure conforms to the IR.73 guideline. This is further achieved by restricting HLR-H 120 from sending any further messages, using otid-h, to VLR-V 124.

In various embodiments of the present invention, the TR unit may send various error codes to VLR-V 124, while the subscriber attempts to register with VLR-V 124. TR unit 116 sends these error codes in an update message (i.e. an ISD message) to VLR-V 124. It will be apparent to a person skilled in the art that this ISD message is different from the previously sent ISD message by HLR-H 120 to VLR-V 124. In an embodiment of the present invention, HPMN 104 can send a plurality of ISD messages to VLR-V 124, prior to sending the registration response message (at step 208), using the same transaction ID as that is used in the LUP message and previously sent ISD message. The ISD messages can also be sent with an error code to ensure that subscriber 108 does not register with VLR-V 124. In an embodiment of the present invention, at step 210, the TR unit sends an update message with RRDuF as an error code, prior to sending the registration response message (at step 208), to restrict the subscriber from registering with the VLR. The update message, issued by TR unit 116, is an ISD message. In an embodiment of the present invention, TR unit 116 sends the ISD message with OTID=otid-h and DTID=otid-v, along with the RRDuF error code to VLR-V 124.

In an embodiment of the present invention, VLR-V 124 may not comply with GSM 3GPP 23.102 standard, and hence do not honor RNA as an error code, in registration response message sent at step 208. Hence, in order to handle such VLRs, the TR unit, at step 212, sends the update message with RRDuF as the error code prior to sending the registration response message (at step 208). By sending RRDuF as the error code, the subscriber's roaming is restricted in VPMN 104. Once subscriber 108's roaming is restricted, TR unit 116 sends the LUP-ACK message with RNA error code to VLR-V 124 (at step 208). In accordance with an embodiment of the present invention, TR unit 116 sends the ISD message (OTID=otid-h and DTID=otid-v), with RRDUF as an error code, to VLR-V 124 prior to sending the LUP-ACK message with RNA as an error code to VLR-V 124, in order to restrict subscriber 108 from registering with VLR-V 124. The ISD message and the LUP ACK message are sent using the same transaction id, to ensure that they are a part of the same location update process. Various embodiments of sending RRDuF error code in the ISD message, prior to sending RNA error code in LUP-ACK message, is described in conjunction with FIGS. 5A and 5B. In case VLR-V 124 is compliant with GSM 3GPP 23.102 standard, then irrespective of the number of ISD operations before LUP-ACK with the RNA error code, VLR-V 124 restricts the subscriber's roaming in VPMN 104.

Figure 3A:
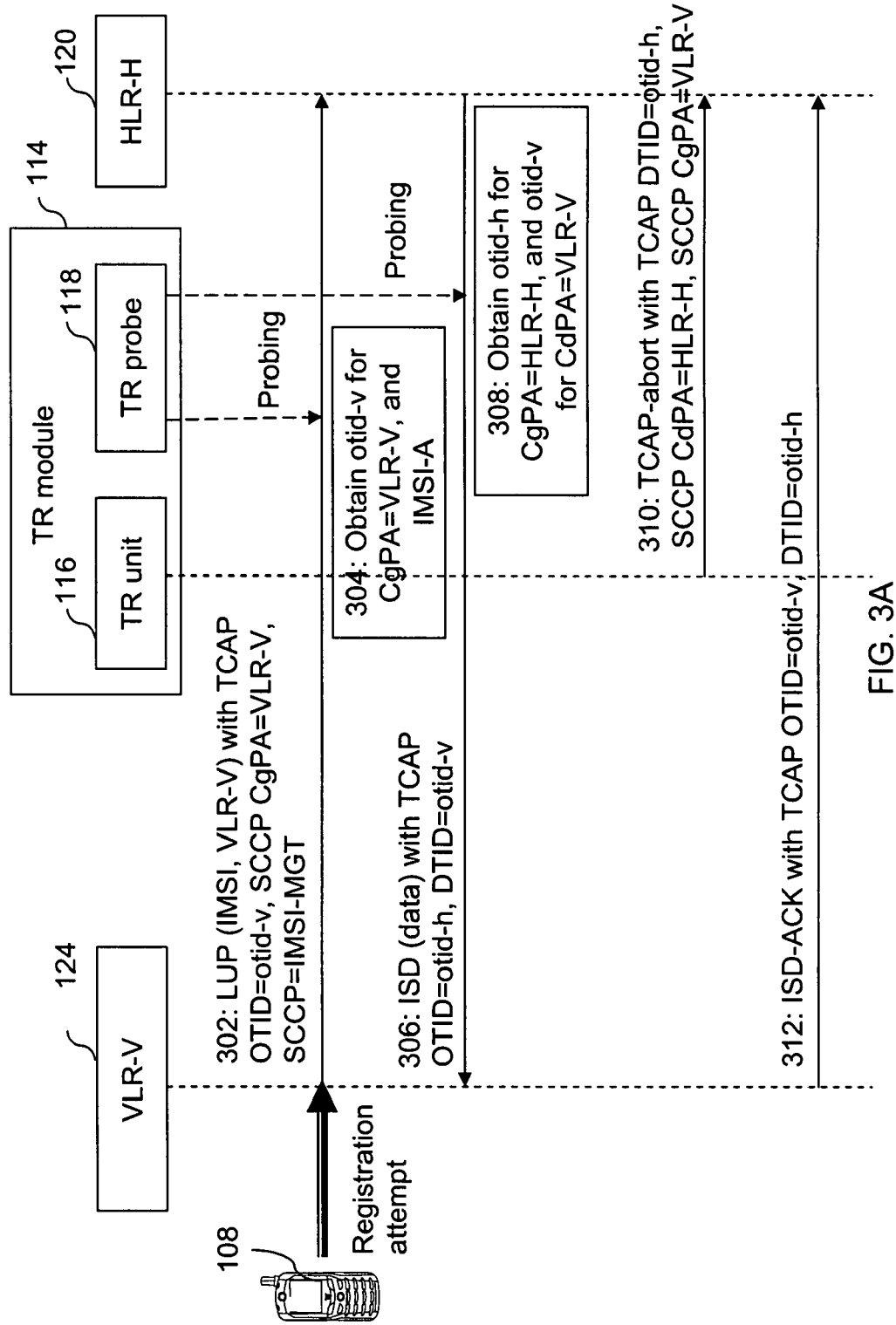

A network operator deploying the TR solution needs to perform either some configuration or monitor SS7 signaling messages at HPMN 102, in order to ensure that the TR solution complies with the IR.73 implementation guideline. The network operator of HPMN 102 can configure TR module 114, in order to ensure that HPMN 102 sends a single registration response message to VPMN 104 during the location update procedure. In order to exemplify further the above mentioned embodiments, FIGS. 3A and 3B represent a flow diagram for the TR solution to restrict the subscriber from registering with a VPMN using RNA as an error code, in accordance with a first embodiment of the present invention. In this embodiment, TR probe 118 monitors various MAP messages associated with subscriber 108, such as, but not limited to, location update (LUP) message and Insert Subscriber Data (ISD) message, exchanged between HPMN 102 and VPMN 104. In addition, TR unit 116 restricts HLR-H 120 from sending any contradictory and subsequent response message(s) to VPMN 104. In other words, TR unit 116 prevents HLR-H 120 from sending any further messages, after some other network element in HPMN 102 has already sent certain messages to VPMN 104 using the same transaction id as used for the LUP message.

Subscriber 108, while roaming in VPMN 104, attempts to register with VLR-V 124. Hence, the subscriber 108's handset sends a registration message (i.e. LUP message) to VLR-V 124. At step 302, VLR-V 124 then initiates the registration process with HPMN 102, and sends the LUP message (with an IMSI of subscriber 108) to HLR-H 120. VLR-V 124 sends the LUP message with OTID as otid-v. It will be apparent to a person skilled in the art that the otid-v is only a representation, used for ease of differentiating between different transaction IDs originating from HPMN 102 and VPMN 104. VLR-V 124 also sends the address of VLR-V as an SCCP Calling Party Address (CgPA), and an IMSI of Mobile Global Title (i.e. IMSI-MGT) associated with subscriber 108 as an SCCP address to HLR-H 120. Hereinafter, subscriber 108 is interchangeably referred to as subscriber A, and the corresponding IMSI associated with subscriber 108 as IMSI-A. It will be apparent to a person skilled in the art that the LUP message is a TCAP-BEGIN message, and hence only OTID is involved when VLR-V 124 sends MAP LUP message to HLR-H 120.

In an embodiment of the present invention, TR probe 118 also captures a Mobile Network Code (MNC) and Mobile Country Code (MCC) of IMSI-A by passively monitoring the LUP message. The MCC and MNC codes correspond to one or more parameters retrieved by TR probe 118. In addition, TR module 114 can maintain a mapping record of the subscriber's profile information, such as, but not limited to, the IMSI-A, the VLR-V address, the VMSC-V address, and the HLR-H address. In one embodiment of the present invention, these one or more parameters, and the subscriber's profile information, can be stored in the database associated with TR module 114. Since TR probe 118 is monitoring signaling messages exchanged between VPMN 104 and HPMN 102, at step 304, TR probe 118 monitors the LUP message (sent at step 302), with CgPA=VLR-V and OTID=otid-v, and retrieves the otid-v for CgPA=VLR-V along with the IMSI-A.

Thereafter, at step 306, HLR-H 120 sends the ISD message to VLR-V 124 with subscriber's data, in order to update the subscriber's profile information at VLR-V 124. HLR-H 120 sends the ISD message, with the OTID as otid-h, and DTID as otid-v, for the ongoing location update process. Here, otid-h corresponds to transaction ID of HLR-H 120. It will be apparent to a person skilled in the art that MAP ISD message is a TCAP-CONTINUE message, and hence involves both OTID and DTID in its TCAP transaction. Further, TR probe 118 recaptures the otid-v for CdPA=VLR-V in the ISD message, originating from HLR-H 120 (at step 306), for correlating the recaptured otid-v with the otid-v for CgPA=VLR-V (i.e., captured in the LUP message at step 304). This is done to ensure that the ISD message that is being monitored, belongs to the same location update process as initiated at step 302. Thus, once the recaptured otid-v in the ISD message is found to be similar to that of the otid-v captured in the LUP message, TR probe 118 further monitors, at step 308, the ISD message (sent at step 306) with CgPA=HLR-H, OTID=otid-h, and DTID=otid-v, to retrieve the otid-h for CgPA=HLR-H. Once TR probe 118 has retrieved otid-v, otid-h, MCC code, and MNC code, it is able to identify the country/zone and the network operator to which subscriber 108 is attempting to register. Hence, TR probe 118 determines whether VPMN 104 is a preferred network and subsequently attempts to thwart the subscriber's registration attempt.

Thereafter, at step 310, TR unit 116 coupled to TR probe 118 in HPMN 102 sends an abort message to HLR-H 120 with TCAP DTID=otid-h (retrieved earlier at step 308), SCCP CdPA=HLR-H, and SCCP CgPA=VLR-V. TR unit 116 sends the abort message, such as TCAP-abort message with DTID=otid-h to HLR-H 120, in order to abort any further message transactions to and from HLR-H 120, using otid-h as the transaction ID. TR unit 116 represents itself as VLR-V 124 to HLR-H 120, by using SCCP CgPA=VLR-V in the TCAP-abort message. Hence, HLR-H 120 acknowledges the received abort message, assuming that the real VLR (i.e. VLR-V 124) is sending the abort message. It will be apparent to a person skilled in the art that the TCAP-abort message is a TCAP-END message and hence involves only DTID in its TCAP transaction. Moreover, according to Q770-Q779 TCAP Specifications, when an application is ending (i.e. TCAP END) or aborting (i.e. TCAP-abort) a transaction, it does not require OTID, only DTID is used in the transaction that involves TCAP-abort or TCAP END.

Upon receiving the ISD message from HLR-H 120 (at step 306), VLR-V 124, at step 312, returns an ISD-ACK message with TCAP-Continue OTID=otid-v and DTID=otid-h to HLR-H 120, as an acknowledgement message to the ISD message. Now, since HLR-H 120's transaction on any message with DTID=otid-h is being aborted by TR unit 116, HLR-H 120 will ignore this TCAP-continue transaction from VLR-V 124. HLR-H 120 will not send any further TCAP messages (with DTID=otid-v and OTID-otid-h) to VLR-V 124. It will be apparent to a person skilled in the art that the ISD-ACK message is a TCAP-CONTINUE message, and hence involves both OTID and DTID in its TCAP transaction. Thus, further transactions from HLR-H 120 (i.e., using otid-h) are prevented, thereby ensuring that HPMN 102's deployed TR conforms to the IR.73 guideline.

In an embodiment of the present invention, when the ISD-ACK message is received at HLR-H 120 with TCAP OTID=otid-v and DTID=otid-h, a TCAP-Provider (located below a TCAP-user, which is also referred as an HLR-H MAP application in the SS7 protocol architecture) can abort this TCAP transaction message. In this embodiment, the TCAP-provider can simply abort the TCAP transaction message using TCAP-P-abort, without presenting this message to the TCAP-user. In another embodiment of the present invention, when the ISD-ACK message is received at HLR-H 120 with OTID=otid-v and DTID=otid-h, the TCAP-user can abort the TCAP transaction message using TCAP-U-abort, in case the TCAP-provider sends this message to the TCAP-user. In accordance with an embodiment of the present invention, the TCAP-abort is referred to as a TCAP-user abort.

Further, in order to also prevent any further messages from VLR-V 124, at step 314, TR unit 116 sends a registration response message to VLR-V 124 with DTID=otid-v, determined from the database associated with TR module 114. Sending this registration response message completes the LUP transaction with VLR-V 124, and restricts subscriber 108 from registering with VLR-V 124. In an embodiment of the present invention, TR unit 116 sends registration response message such as, but not limited to, an LUP-ACK message, a Transaction Capabilities Application Part (TCAP) Abort message, and a Mobile Application Part (MAP) Cancel Location message. In other words, TR unit 116 sends the LUP-ACK message with TCAP DTID=otid-v, SCCP CdPA=VLR-V, SCCP CgPA=HLR-H which represents itself as HLR-H to VLR-V 124 as it sends this LUP-ACK message, using SCCP CdPA=VLR-V, SCCP CgPA=HLR-H, and TCAP DTID=otid-v in the message. TR unit 116 determines the otid-v (that was retrieved and stored by passively monitoring the LUP message) from the database.

In an embodiment of the present, TR unit 116 sends the LUP-ACK message to VLR-V 124 with a first error code such as, but not limited to, SF, UDV, MD, and RNA. HPMN 102 sends these error codes when TR probe 118 determines (at step 302) VPMN 104 as a non-preferred network. Hence, by sending these error codes to VLR-V 124, TR unit 116 prevents or restricts subscriber 108 from registering with VPMN 104. TR unit 116 sends the first error code based on the subscriber's profile information and one or more parameters (MCC and MNC) stored in the database. In another embodiment of the present invention, TR unit 116 sends the LUP-ACK message to VLR-V 124 without any error code, to allow subscriber 108 to register with VPMN 104 upon determining VPMN 104 as a preferred network. It will be apparent to a person skilled in the art that the TCAP-abort message, the MAP Cancel Location, and the MAP LUP-ACK corresponds to a TCAP-END message, and hence involves only DTID in their transactions.

In an embodiment of the present invention, VLR-V 124 may not follow standard (e.g., 3GPP 23.102) to honor RNA as an error code in the LUP-ACK message sent from HPMN 102, when VLR-V 124 receives an ISD message from HLR-H 120, prior to this LUP-ACK message. Hence, in such a case, HPMN 102 will be unable to restrict subscriber 108 from registering with the non-preferred network VPMN 104. Various embodiments of IR.73 compliant TR solution, dealing with such cases of VLR-V not honoring RNA as an error code, are described in conjunction with FIGS. 5A and 5B.

Figure 4A:
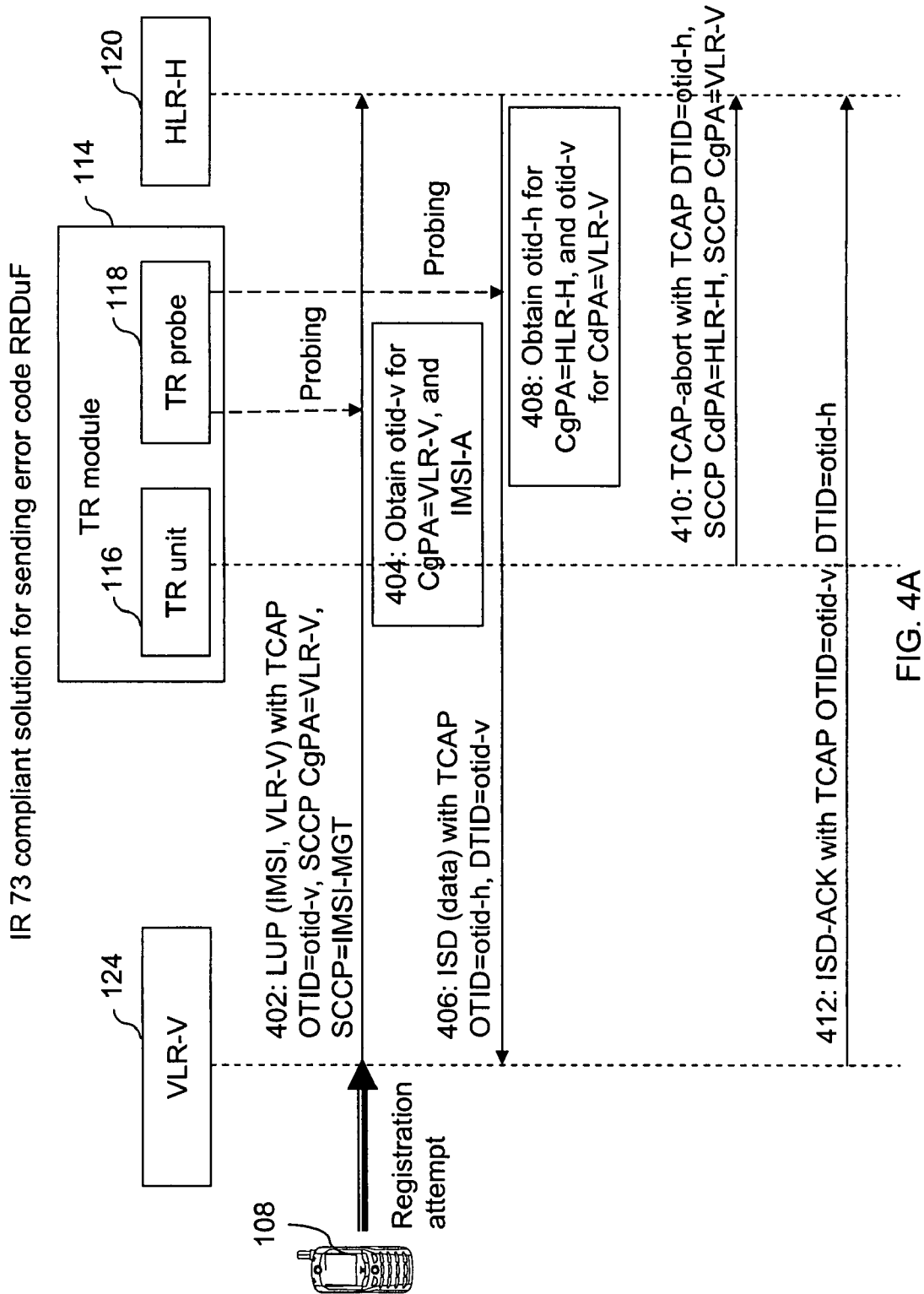
FIGS. 4A and 4B is a flow diagram representing the TR solution to restrict the subscriber from registering with a VPMN using RRDuF as an error code, in accordance with a second embodiment of the present invention.
Figure 4B:
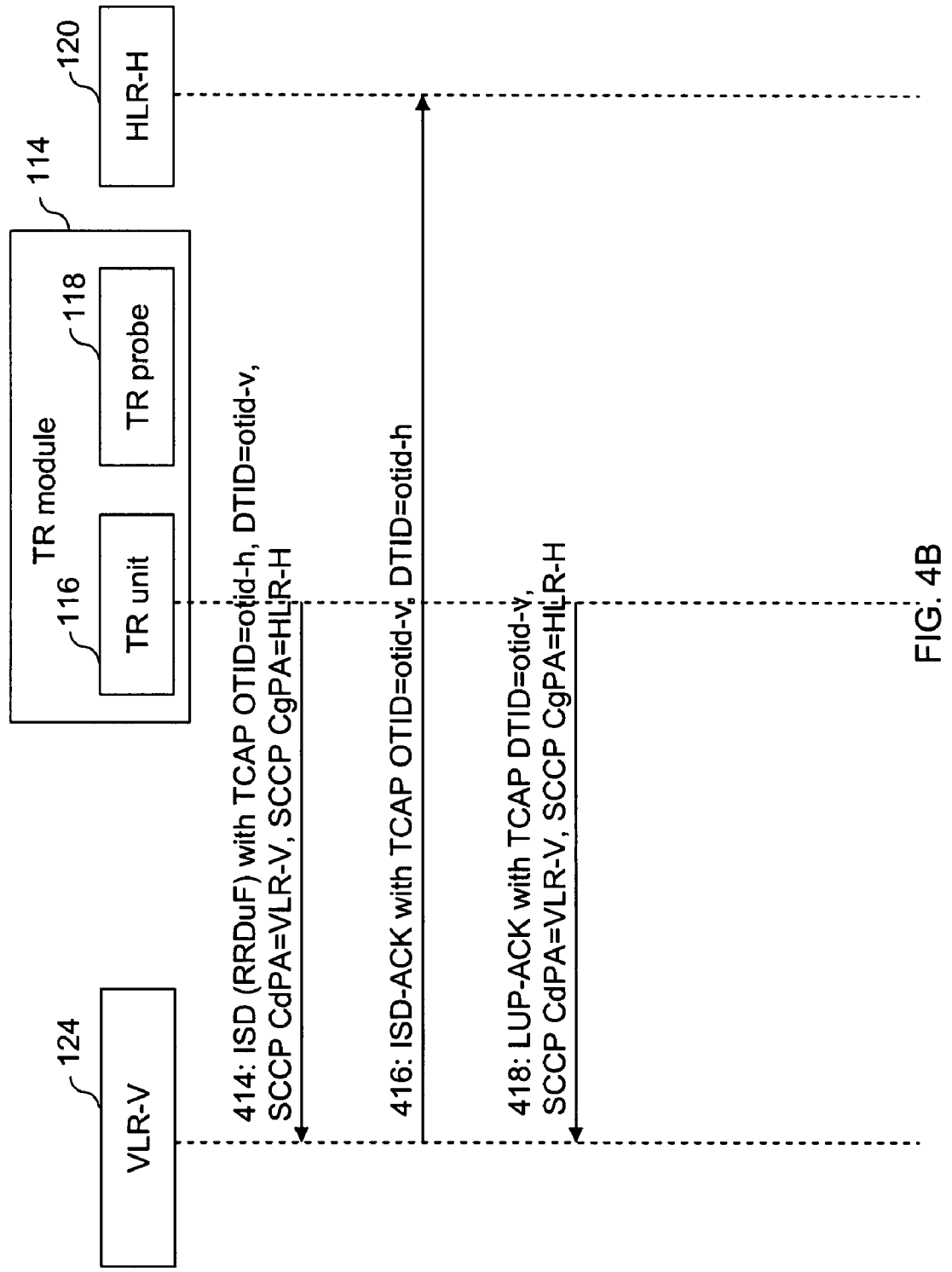

As described above, HPMN 102 can also send an error code such as, but not limited to, Roaming Restriction Due to Unsupported Feature (RRDuF) to VPMN 104. FIGS. 4A and 4B is a flow diagram representing the TR solution to restrict the subscriber from registering with a VPMN, using RRDuF as an error code, in accordance with a second embodiment of the present invention. Steps 402 to 412 describe the location update process (i.e. sending LUP message by VLR-V 124 to HLR-H 120) and ISD exchange process (i.e. exchange of ISD message and ISD-ACK message). In addition, the above mentioned steps describe the process of sending TCAP-abort message by TR unit 116 to HLR-H 120, to abort the transactions at HLR-H 120, using otid-h as the transaction ID. All these steps (402 to 412) are similar to corresponding steps (302 to 312) described in conjunction with in FIGS. 3A and 3B. In an embodiment of the present invention, during the ongoing location update procedure, exchange of one or more ISD or Delete Subscriber Data (DSD) messages occurs between HPMN 102 and VPMN 104, using the same transaction IDs. Further, at step 414, TR unit 116 sends an ISD message to VLR-V 124 with TCAP OTID=otid-h and DTID=otid-v, and a second error code (i.e. RRDuF). TR unit 116 represents itself as HLR-H 112 to VLR-V 124, when it sends the ISD message with SCCP CdPA=VLR-V, SCCP CgPA=HLR-H, TCAP OTID=otid-h and DTID=otid-v. It will be apparent to a person skilled in the art that the RRDuF error code defines that a subscriber is not allowed to roam in a current MSC area coupled to a VPMN. In addition, HPMN 102 sends this error code if a feature or service is indicated as not being supported by VLR-V 124. Moreover, when HPMN 102 (i.e. TR unit 116 acting as an HLR to VLR-V 124) sends this error code to VLR-V 124, HLR-H 120 and VLR-V 124 restrict the MSC area. Further, TR unit 116 stores and sends the RRDuF error code in the ISD message to VLR-V 124. Since the RRDuF error code is stored in HLR-H 120, the "MSC area restricted flag" is set to "restricted". This prevents any MT calls, MT SMS, and MT USSD from being forwarded to VLR-V 124 or VMSC-V 126 in VPMN 104.

In response to the ISD message received from HLR-H 120 (at step 414), VLR-V 124 acknowledges the ISD message by sending an ISD-ACK message with OTID=otid-v and DTID=otid-h to HLR-H 120, at step 416. However, HLR-H 120 aborts the transaction (i.e. ISD-ACK message) due to an abort message (i.e. TCAP-abort) previously sent by TR unit 116 (at step 410) with DTID=otid-h to HLR-H 120. Various embodiments of aborting the MAP ISD transaction are described earlier in conjunction with FIGS. 3A and 3B. Thus, the subscriber's registration with VLR-V 124 is prevented due to the RRDuF error code sent in the ISD message (at step 414). Finally, at step 418, TR unit 116 sends an LUP-ACK message with TCAP DTID=otid-v, SCCP CdPA=VLR-V, and SCCP CgPA=HLR-H to VLR-V 124, to restrict subscriber 108 from registering with VLR-V 124. Again, TR unit 116 represents itself as HLR-H to VLR-V 124, while sending LUP-ACK message.

In an embodiment of the present invention, when VLR-V 124 receives the LUP-ACK message, after receiving an ISD message with RRDuF as an error code, the subscriber's registration is allowed to complete successfully in VLR-V 124. However, VLR-V 124, on determining this error code, sends a message such as "Roaming Not Allowed in this Location Area", to the subscriber's handset. When the subscriber's handset receives this message, it starts searching for a new Public Land Mobile Network (PLMN). In an embodiment of the present invention, when no other PLMN is found, subscriber 108 stays on the location area in VPMN 104 and only emergency calls are allowed to and from the subscriber's handset. The details of various embodiments for restricting subscriber's registration with VLR-V when RRDuF error code is determined at VLR-V have been described in the previous TR filing.

Figure 5A:
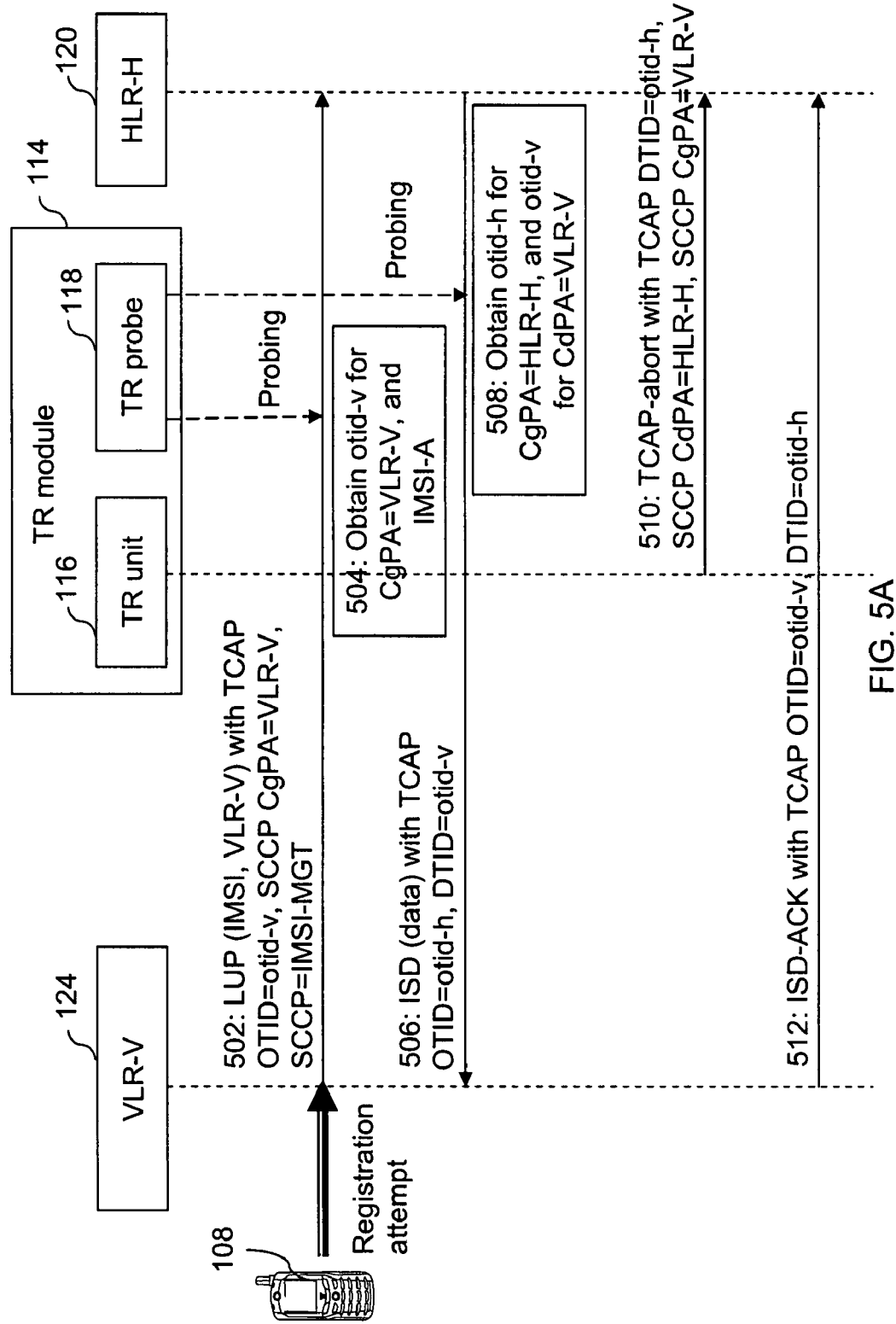

In accordance with another embodiment of the present invention, TR unit 116 sends RNA error code in the LUP-ACK message to VLR-V 124, after sending the RRDuF as a second error code in the ISD message to VLR-V 124. This is done in order to restrict subscriber 108 from registering with VLR-V 124, in case VLR-V 124 is not compliant with GSM 3GPP 23.102 standard. FIGS. 5A and 5B is a flow diagram representing the TR solution to restrict the subscriber from registering with a VPMN, using RNA and RRDuF as the error codes, when a VLR in the VPMN doesn't follow the GSM 23.102 standard. Steps 502 to step 516, describing the LUP process, ISD exchange process, and TCAP-abort message sent by TR unit 116, are similar to corresponding steps (402 to 416) described above in FIGS. 4A and 4B.

It will be apparent to a person skilled in the art that when subscriber 108 receives RNA as an error code, the forbidden list, embedded in the subscriber's handset gets updated, with VPMN 104 as a non-preferred network, if VPMN 104 is determined as the non-preferred network by TR module 114 (or TR unit 116). This causes the subscriber's handset not to make any further registration attempts at VPMN 104. TR unit 116 sends the RNA error code by querying the database containing a list of preferred networks. If VPMN 104 is not found in the preferred networks list (i.e. stored in the database associated with TR module 114), it is moved to the forbidden list of the subscriber 108's handset. Hence, at step 518, TR unit 116 sends an LUP-ACK message along with RNA as an error code with TCAP DTID=otid-v, SCCP CdPA=VLR-V, and SCCP CgPA=HLR-H, to prevent subscriber 108 from registering with VLR-V 124.

In another embodiment of the present invention, in case VLR-V 124 follows 3GPP standard 23.102, then irrespective of one or more ISD messages being received at VLR-V 124 before the LUP-ACK message, VLR-V 124 still honors the LUP transaction with RNA error code for subscriber 108. Thus, FIGS. 5A and 5A are applicable for both the cases and are independent of whether VLR-V 124 follows the 3GPP standard 23.102.

It will be apparent to a person skilled in the art, that the redirection of cellular traffic can also be performed for subscribers using CDMA/ANSI-41D, and other technologies such as, but may not be limited to, VoIP, WiFi, 2G, 3G, and inter-standard roaming. For example, the traffic of a CDMA roaming subscriber traveling to a VPMN may be redirected to ensure that the roaming subscriber registers with a preferred VPMN operator. To support these variations, TR unit 116 and TR probe 118 will have an SS7 network interface, corresponding to the VPMN network and the HPMN network. It would be obvious to a person skilled in the art that these two interfaces in different directions may not have to be of the same technologies. In addition, there could be multiple types of interfaces in both directions.

The present invention can take the form of an entirely hardware embodiment, an entirely software embodiment, or an embodiment containing both hardware and software elements. In accordance with an embodiment of the present invention, software, including but not limited to, firmware, resident software, and microcode, implements the invention.

Furthermore, the invention can take the form of a computer program product, accessible from a computer-usable or computer-readable medium providing program code for use by, or in connection with, a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CDROM), compact disk-read/write (CD-R/W) and Digital Versatile Disk (DVD).

A computer usable medium provided herein includes a computer usable program code, which when executed, redirects roaming traffic associated with a subscriber. The computer program product further includes a computer usable program code for retrieving a first transaction ID at a TR probe, by monitoring a registration message intended for a home location information database. The computer program product further includes a computer usable program code for retrieving a second transaction ID at the TR probe, by monitoring an update message originating from the home location information database. The computer program product further includes a computer usable program code for sending an abort message by a TR unit, to the home location information database with the second transaction ID as a Destination Transaction ID (DTID) to restrict any further transactions with the home location information database using the second transaction ID. The computer program product further includes a computer usable program code for sending a registration response message by the TR unit, to a visited location information database with the first transaction ID as the DTID to restrict the subscriber from registering with the visited location information database.

A home network operator uses one or more variations of the present invention to redirect its subscribers to a preferred visited network even when they are not in the coverage of their home network. The present invention redirects the roaming traffic associated with the subscriber while they are outbound roaming, while conforming to GSMA IR.73 compliant solution. The home network operator complies with the IR.73 guideline by restricting its network components to send a single registration response message for every registration message that it receives. The subscribers who roam in both CDMA and GSM networks would also be able to avail of the services of the present invention. The home network operator ensures that VPMNs that are being rejected are not inadvertently affected due to home network operator's deployed TR solution. These service can be call related and value added services (VAS). The system further ensures that the VPMNs that do not honor RNA error code in registration response messages at least restrict the subscriber from registering with the VPMNS.

The components of present system described above include any combination of computing components and devices operating together. The components of the present system can also be components or subsystems within a larger computer system or network. The present system components can also be coupled with any number of other components (not shown), such as other buses, controllers, memory devices, and data input/output devices, in any number of combinations. In addition, any number or combination of other processor-based components may be carrying out the functions of the present system.

It should be noted that the various components disclosed herein may be described using computer aided design tools and/or expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof.

Unless the context clearly requires otherwise, throughout the description and the claims, the words "comprise," "comprising," and the like are to be construed in an inclusive sense as opposed to an exclusive or exhaustive sense; that is to say, in a sense of "including, but may not be limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, it covers all of the following interpretations: any of the items in the list, all of the items in the list and any combination of the items in the list.

The above description of illustrated embodiments of the present system is not intended to be exhaustive or to limit the present system to the precise form disclosed. While specific embodiments of, and examples for, the present system are described herein for illustrative purposes, various equivalent modifications are possible within the scope of the present system, as those skilled in the art will recognize. The teachings of the present system provided herein can be applied to other processing systems and methods. They may not be limited to the systems and methods described above.

The elements and acts of the various embodiments described above can be combined to provide further embodiments. These and other changes can be made in light of the above detailed description.

Other Variations

Provided above for the edification of those of ordinary skill in the art, and not as a limitation on the scope of the invention, are detailed illustrations of a scheme for redirecting roaming traffic associated with a subscriber. Numerous variations and modifications within the spirit of the present invention will of course occur to those of ordinary skill in the art in view of the embodiments that have been disclosed. For example, the present invention is implemented primarily from the point of view of GSM mobile networks as described in the embodiments. However, the present invention may also be effectively implemented on GPRS, 3G, CDMA, WCDMA, WiMax etc., or any other network of common carrier telecommunications in which end users are normally configured to operate within a "home" network to which they normally subscribe, but have the capability of also operating on other neighboring networks, which may even be across international borders.

The examples under the system of present invention detailed in the illustrative examples contained herein are described using terms and constructs drawn largely from GSM mobile telephony infrastructure. However, use of these examples should not be interpreted as limiting the invention to those media. The system and method can be of use and provided through any type of telecommunications medium, including without limitation: (i) any mobile telephony network including without limitation GSM, 3GSM, 3G, CDMA, WCDMA or GPRS, satellite phones or other mobile telephone networks or systems; (ii) any so-called WiFi apparatus normally used in a home or subscribed network, but also configured for use on a visited or non-home or non-accustomed network, including apparatus not dedicated to telecommunications such as personal computers, Palm-type or Windows Mobile devices; (iii) an entertainment console platform such as Sony Playstation, PSP or other apparatus that are capable of sending and receiving telecommunications over home or non-home networks, or even (iv) fixed-line devices made for receiving communications, but capable of deployment in numerous locations while preserving a persistent subscriber id such as the eye2eye devices from Dlink; or telecommunications equipment meant for voice over IP communications such as those provided by Vonage or Packet8.

In the foregoing specification, specific embodiments of the present invention have been described. However, one of ordinary skill in the art will appreciate that various modifications and changes can be made without departing from the scope of the present invention as set forth in the claims below. Accordingly, the specification and the figures are to be regarded in an illustrative rather than a restrictive sense, and all such modifications are intended to be included within the scope of present invention. The benefits, advantages, solutions to problems, and any element(s) that may cause any benefit, advantage, or solution to occur, or to become more pronounced, are not to be construed as a critical, required, or essential feature or element of any or all of the claims.

APPENDIX

| Acronym | Description |
| --- | --- |
| 3G | Third generation of mobile |
| ACM | ISUP Address Completion Message |
| ANM | ISUP Answer Message |
| ANSI-41 | American National Standards Institute #41 |
| ATI | Any Time Interrogation |
| BCSM | Basic Call State Model |
| BSC | Base Station Controller |
| CAMEL | Customized Application for Mobile Enhanced Logic |
| CAP | Camel Application Part |
| CB | Call Barring |
| CC | Country Code |
| CDMA | Code Division Multiplexed Access |
| CdPA | Called Party Address |
| CgPA | Calling Party Address |
| CLI | Calling Line Identification |
| CSD | Circuit Switched Data |
| CSI | Camel Subscription Information |
| DPC | Destination Point Code |
| DSD | Delete Subscriber Data |
| ERB | CAP Event Report Basic call state model |
| FPMN | Friendly Public Mobile Network |
| FTN | Forward-To Number |
| GLR | Gateway Location Register |
| GMLC | Gateway Mobile Location Centre |
| GMSC | Gateway MSC |
| GMSC-F | GMSC in FPMN |
| GMSC-H | GMSC in HPMN |
| GMSC-V | GMSC in VPMN |
| GPRS | General Packet Radio System |
| GSM | Global System for Mobile |
| GSM SSF | GSM Service Switching Function |
| gsmSCF | GSM Service Control Function |
| GT | Global Title |
| HLR | Home Location Register |
| HLR-F | Forward-to number HLR |
| HLR-H | HPMN HLR |
| HLR-V | VPMN HLR |
| HPMN | Home Public Mobile Network |

APPENDIX-continued

| Acronym | Description |
|---|---|
| GTT | Global Title Translation |
| IAM | Initial Address Message |
| IDP | Initial DP IN/CAP message |
| IMSI | International Mobile Subscriber Identity |
| IMSI-H | HPMN IMSI |
| IN | Intelligent Network |
| INAP | Intelligent Network Application Part |
| INE | Interrogating Network Entity |
| IP | Internet Protocol |
| ISC | International Service Carrier |
| ISD | MAP Insert Subscriber Data |
| ISG | International Signal Gateway |
| ISTP | International STP |
| ISTP-F | ISTP connected to FPMN STP |
| ISTP-H | ISTP connected to HPMN STP |
| ISUP | ISDN User Part |
| ITR | Inbound Traffic Redirection |
| IVR | Interactive Voice Response |
| LCS | LoCation Service |
| LU | Location Update |
| LUP | MAP Location Update |
| MAP | Mobile Application Part |
| MCC | Mobile Country Code |
| MCC | Mobile Country Code |
| MD | Missing Data |
| ME | Mobile Equipment |
| MGT | Mobile Global Title |
| MMS | Multimedia Message Service |
| MMSC | Multimedia Message Service Center |
| MMSC-F | Forward-to number MMSC |
| MMSC-H | HPMN MMSC |
| MMSC-V | VPMN MMSC |
| MNC | Mobile Network Code |
| MO | Mobile Originated |
| MSC | Mobile Switching Center |
| MSISDN | Mobile Station International Subscriber Directory Number |
| MSISDN-F | Forward-to number MSISDN |
| MSISDN-H | HPMN MSISDN |
| MSRN | Mobile Station Roaming Number |
| MSRN-F | Forward-to number MSRN |
| MSRN-H | HPMN MSRN |
| MT | Mobile Terminated |
| MTP | Message Transfer Part |
| NDC | National Dialing Code |
| NP | Numbering Plan |
| NPI | Numbering Plan Indicator |
| O-CSI | Originating CAMEL Subscription Information |
| ODB | Operator Determined Barring |
| OTA | Over The Air |
| PPG | Push Proxy Gateway |
| PRN | MAP Provide Roaming Number |
| PSL | Provide Subscriber Location |
| PSI | MAP Provide Subscriber Information |
| RI | Routing Indicator |
| RNA | Roaming Not Allowed |
| RRDuF | Roaming Restricted due to unsupported feature |
| RRB | CAP Request Report Basic call state model |
| RSD | ReStore Data |
| SAI | Send Authentication Information |
| SCCP | Signal Connection Control part |
| SCP | Signaling Control Point |
| SCP-H | HPMN SCP |
| SG | Signaling Gateway |
| SGSN | Serving GPRS Support Node |
| SGSN-H | HPMN SGSN |
| SGSN-F | Forward-to number SGSN |
| SGSN-V | VPMN SGSN |
| SF | System Failure |
| SIM | Subscriber Identity Module |
| SME | Short Message Entity |
| SM-RP-UI | Short Message Relay Protocol User Information |
| SMS | Short Message Service |

APPENDIX-continued

| Acronym | Description |
|---|---|
| SMSC | Short Message Service Center |
| SMSC-O | Originating SMSC |
| SMSC-F | Forward-to number SMSC |
| SMSC-H | HPMN SMSC |
| SMSC-V | VPMN SMSC |
| SPC | Signal Point Code |
| SRI | MAP Send Routing Information |
| SRI-LCS | MAP Send Routing Information For LoCation Service |
| SRI-SM | MAP Send Routing Information For Short Message |
| SS | Supplementary Services |
| SS7 | Signaling System #7 |
| SSN | Sub System Number |
| SSP | Service Switch Point |
| STK | SIM Tool Kit Application |
| STP | Signal Transfer Point |
| STP-F | FPMN STP |
| STP-H | HPMN STP |
| TCAP | Transaction Capabilities Application Part |
| T-CSI | Terminating CAMEL Service Information |
| TP | SMS Transport Protocol |
| TR | Traffic Redirection |
| TT | Translation Type |
| UD | User Data |
| UDV | Unexpected Data Value |
| UDH | User Data Header |
| UDHI | User Data Header Indicator |
| USSD | Unstructured Supplementary Service Data |
| VAS | Value Added Service |
| VLR | Visited Location Register |
| VLR-F | Forward-to Number VLR |
| VLR-H | HPMN VLR |
| VLR-V | VPMN VLR |
| VMSC | Visited Mobile Switching Center |
| VMSC-F | Forward-to Number VMSC |
| VMSC-H | HPMN VMSC |
| VMSC-V | VPMN VMSC |
| VPMN | Visited Public Mobile Network |
| WAP | Wireless Access Protocol |

Technical References, each of which is Incorporated by Reference Herein:

Digital cellular telecommunications system (Phase 2+); Mobile Application Part (MAP) Specification (3GPP TS 09.02 version 7.9.0 Release 1998)

Q71X SCCP

Q70X MTP

Q77X TCAP

GSM 1111 SIM and Mobile Interface;

GSM 1114 SIM Toolkit;

IR 7320 Steering of Roaming;

GSM 348 Security and OTA;

GSM 31048 Security and OTA;

GSM 23119 Gateway Location Register;

GSM 408 Mobile Radio Interface Network Layer;

GSM 23122 Mobile Station Procedure;

GSM 24008 Mobile Radio Interface Network Layer;

GSM22011 Service Accessibility;

GSM25304 Idle Mode Selection;

GSM29010 Error Network Mapping;

GSM 29002 MAP Protocol;

IR 73 Steering of Roaming;

GSM 23012 Location Update Management;

Jiang et al Traffic Steering Patent;

I claim:

1. A system for redirecting roaming traffic associated with a subscriber, the subscriber having profile information, the system comprising:
    means for retrieving a first transaction ID by passively monitoring a registration message intended for a home location information database, and for retrieving a second transaction ID by passively monitoring an update message originating from the home location information database; and
    means for sending an abort message to the home location information database with the second transaction ID as a Destination Transaction ID (DTID) to restrict any further transactions with the home location information database using the second transaction ID, and for sending a registration response message to a visited location information database with the first transaction ID as the DTID to restrict the subscriber from registering with the visited location information database, based on the subscriber's profile information stored in a database associated with the home location information database;
    wherein the retrieving means further recaptures the first transaction ID, sent as the DTID in the update message originating from the home location information database, to correlate the recaptured first transaction ID with the first transaction ID retrieved from the registration message.

2. The system of claim 1, wherein the retrieving means recaptures the first transaction ID in the update message prior to the retrieval of the second transaction ID.

3. The system of claim 1, wherein the retrieving means further retrieves one or more parameters, by monitoring the registration message, wherein the one or more parameters are associated with the subscriber's current location.

4. The system of claim 3 further comprising:
    a database associated with the sending means for storing the one or more parameters.

5. The system of claim 1, wherein the redirection of roaming traffic is compliant with IR.73 Steering of Roaming (SoR) guideline.

6. The system of claim 1, wherein the home location information database is a Home Location Register (HLR) associated with the subscriber, wherein the HLR, the retrieving means and the sending means are coupled to a first network.

7. The system of claim 1, wherein the visited location information database is a Visitor Location Register (VLR) associated with the subscriber's current location, and is related to a second network.

8. The system of claim 1, wherein the registration response message is selected from a group consisting of a LUP ACK message, a Transaction Capabilities Application Part (TCAP) Abort message, and a Mobile Application Part (MAP) Cancel Location message.

9. The system of claim 1, wherein sending the registration response message by the sending means comprises sending a first error code with the registration response message.

10. The system of claim 9, wherein the first error code is selected from a group consisting of a System Failure (SF), an Unexpected Data Value (UDV), a Missing Data (MD), and a Roaming Not Allowed (RNA).

11. The system of claim 1, wherein the sending means sends the registration response message to the visited location information database, upon sending a second error code along with the update message to the visited location information database, with the first transaction ID as the DTID and the second transaction ID as an Originating Transaction ID (OTID).

12. The system of claim 11, wherein the second error code is Roaming Restriction Due to Unsupported Feature (RR-DuF).

13. The system of claim 11, wherein the sending means sends the registration response message with RNA as an error code to restrict the subscriber from registering with visited location information database in case the visited location information database is non-compliant with GSM 3GPP 23.102 standard.

14. The system of claim 1, wherein the sending means sends an abort message to the home location information database, causing the home location information database to abort all messages received at the home location information database, with the second transaction ID as the DTID.

* * * * *